(12) United States Patent
Moore et al.

(10) Patent No.: US 11,976,915 B2
(45) Date of Patent: *May 7, 2024

(54) OPTICAL INTERROGATOR FOR PERFORMING INTERFEROMETRY USING FIBER BRAGG GRATINGS

(71) Applicant: Hifi Engineering Inc., Calgary (CA)

(72) Inventors: Brian H. Moore, Edmonton (CA); Walter Jeffrey Shakespeare, Macungie, PA (US); Phillip William Wallace, Bernardsville, NJ (US); Viet Hoang, Edmonton (CA); Chris Henrikson, Calgary (CA); Ajay Sandhu, Calgary (CA); Adrian Dumitru, Calgary (CA); Thomas Clement, Calgary (CA); Dongliang Huang, Calgary (CA); Seyed Ehsan Jalilian, Calgary (CA)

(73) Assignee: Hifi Engineering Inc., Calgary (CA)

( * ) Notice: Subject to any disclaimer, the term of this patent is extended or adjusted under 35 U.S.C. 154(b) by 0 days.

This patent is subject to a terminal disclaimer.

(21) Appl. No.: 18/073,211

(22) Filed: Dec. 1, 2022

(65) Prior Publication Data

US 2023/0104471 A1 Apr. 6, 2023

Related U.S. Application Data

(63) Continuation of application No. 17/521,052, filed on Nov. 8, 2021, now Pat. No. 11,609,086, which is a
(Continued)

(30) Foreign Application Priority Data

Jun. 8, 2017 (CA) ................................ CA 2970205

(51) Int. Cl.
*G01B 11/16* (2006.01)
*G01D 5/353* (2006.01)
(Continued)

(52) U.S. Cl.
CPC ............ *G01B 11/161* (2013.01); *G01B 11/18* (2013.01); *G01D 5/35316* (2013.01);
(Continued)

(58) Field of Classification Search
CPC .......... G01D 5/35316; G01D 5/35383; G01B 11/161; G01B 11/18; G01H 9/004; G01K 11/3206; G01L 1/246
See application file for complete search history.

(56) References Cited

U.S. PATENT DOCUMENTS 5,481,391 A 1/1996 Giles
5,649,035 A 7/1997 Zimmerman et al.
(Continued)

FOREIGN PATENT DOCUMENTS

GB 2262983 A * 7/1993 ............. G01B 11/18
WO WO2016/012760 A2 1/2016
WO WO2016/086310 A1 6/2016

OTHER PUBLICATIONS

International Search Report and Written Opinion of the International Searching Authority, dated Aug. 16, 2018, for corresponding International Application No. PCT/CA2018/050682, 22 pages.
(Continued)

*Primary Examiner* — Octavia Davis Hollington
(74) *Attorney, Agent, or Firm* — Klarquist Sparkman, LLP

(57) ABSTRACT

There is described a method for interrogating optical fiber comprising fiber Bragg gratings ("FBGs"), using an optical fiber interrogator. The method comprises (a) generating an initial light pulse from phase coherent light emitted from a
(Continued)

light source, wherein the initial light pulse is generated by modulating the intensity of the light; (b) splitting the initial light pulse into a pair of light pulses; (c) causing one of the light pulses to be delayed relative to the other of the light pulses; (d) transmitting the light pulses along the optical fiber; (e) receiving reflections of the light pulses off the FBGs; and (f) determining whether an optical path length between the FBGs has changed from an interference pattern resulting from the reflections of the light pulses.

18 Claims, 17 Drawing Sheets

Related U.S. Application Data continuation of application No. 15/868,766, filed on Jan. 11, 2018, now Pat. No. 11,199,393.

(51) Int. Cl.
  *G01H 9/00* (2006.01)
  *G01K 11/3206* (2021.01)
  *G01L 1/24* (2006.01)

(52) U.S. Cl.
  CPC ......... *G01D 5/35383* (2013.01); *G01H 9/004* (2013.01); *G01K 11/3206* (2013.01); *G01L 1/246* (2013.01)

(56) References Cited

U.S. PATENT DOCUMENTS

| | | | |
|---|---|---|---|
| 5,848,204 A | 12/1998 | Wanser | |
| 6,137,565 A | 10/2000 | Ecke et al. | |
| 6,417,507 B1 | 7/2002 | Malvern et al. | |
| 6,466,706 B1 | 10/2002 | Vinson et al. | |
| 6,674,928 B2 | 1/2004 | Johnson et al. | |
| 6,778,720 B1 | 8/2004 | Cekorich et al. | |
| 6,785,004 B2 | 8/2004 | Kersey et al. | |
| 7,145,704 B1 | 12/2006 | Islam | |
| 7,359,061 B2 | 4/2008 | Waagaard et al. | |
| 7,433,045 B2 | 10/2008 | Ronnekleiv et al. | |
| 7,697,121 B1 | 4/2010 | Coroy et al. | |
| 7,940,400 B2 | 5/2011 | Lopushansky et al. | |
| 8,339,591 B2 | 12/2012 | Volanthen et al. | |
| 8,401,401 B2 | 3/2013 | Hartog et al. | |
| 8,737,439 B2 | 5/2014 | Wilk et al. | |
| 8,994,953 B2 | 3/2015 | Crickmore | |
| 9,086,325 B2 * | 7/2015 | Nash | G01D 5/35383 |
| 9,163,958 B2 | 10/2015 | Zadok et al. | |
| 9,476,760 B2 | 10/2016 | Brady et al. | |
| 9,500,767 B2 | 11/2016 | Barfoot et al. | |
| 10,247,581 B2 | 4/2019 | Ronnekleiv et al. | |
| 10,416,005 B2 | 9/2019 | Moore et al. | |
| 11,757,529 B1 * | 9/2023 | Chaffee | H04B 10/1129 398/115 |
| 2003/0169956 A1 | 9/2003 | Lange et al. | |
| 2012/0274942 A1 | 11/2012 | Austin | |
| 2014/0152995 A1 | 6/2014 | Dong et al. | |
| 2015/0100279 A1 | 4/2015 | Ronnekleiv et al. | |
| 2016/0139036 A1 | 5/2016 | Babin | |
| 2016/0231197 A1 | 8/2016 | Baker et al. | |
| 2016/0266005 A1 | 9/2016 | Bos | |
| 2022/0057275 A1 | 2/2022 | Hull et al. | |

OTHER PUBLICATIONS

Dutton, "Understanding Optical Communications," IBM, International Technical Support Organization, http://www.redbooks.ibm.com, SG24-5230-00, 638 pgs, Sep. 1998.

Office Action from the United States Patent & Trademark Office in U.S. Appl. No. 15/868,766, dated Nov. 30, 2018.

Office Action from the United States Patent & Trademark Office in U.S. Appl. No. 15/868,766, dated Jul. 25, 2019.

Office Action from the United States Patent & Trademark Office in U.S. Appl. No. 15/868,766, dated Mar. 2, 2020.

Office Action from the United States Patent & Trademark Office in U.S. Appl. No. 15/868,766, dated Jun. 25, 2020.

Office Action from the United States Patent & Trademark Office in U.S. Appl. No. 15/868,766, dated Dec. 24, 2020.

Office Action from the United States Patent & Trademark Office in U.S. Appl. No. 15/868,766, dated Jun. 10, 2021.

Notice of Allowance from the United States Patent & Trademark Office in U.S. Appl. No. 15/868,766, dated Sep. 10, 2021.

Office Action from the United States Patent & Trademark Office in co-pending U.S. Appl. No. 17/521,052, dated Oct. 5, 2022.

\* cited by examiner

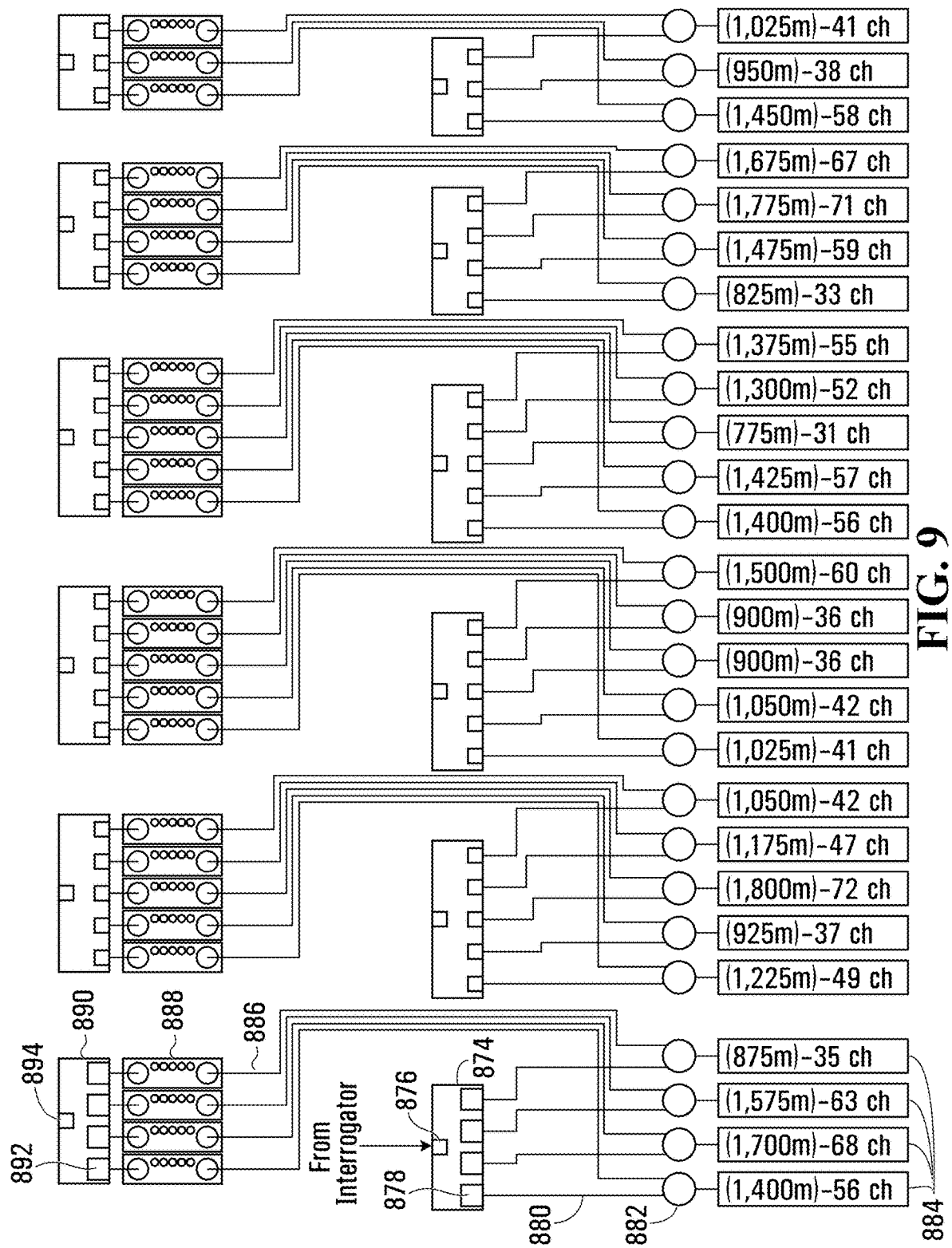

OPTICAL INTERROGATOR FOR PERFORMING INTERFEROMETRY USING FIBER BRAGG GRATINGS

CROSS REFERENCE TO RELATED APPLICATIONS

This application is a continuation of U.S. patent application Ser. No. 17/521,052, filed on Nov. 8, 2021, which is a continuation of U.S. patent application Ser. No. 15/868,766, filed on Jan. 11, 2018, now U.S. Pat. No. 11,199,393, which claims the benefit of and priority to Canada Patent Application No. 2,970,205, filed on Jun. 8, 2017, all of which applications are incorporated herein by reference.

TECHNICAL FIELD

The present disclosure is directed at an optical interrogator for performing interferometry using fiber Bragg gratings.

BACKGROUND

Optical interferometry is a technique in which two separate light pulses, a sensing pulse and a reference pulse, are generated and interfere with each other. When optical interferometry is used for fiber optic sensing applications, the sensing and reference pulses are at least partially reflected back towards an optical receiver. For example, optical interferometry may be performed by directing the sensing and reference pulses along an optical fiber that comprises fiber Bragg gratings, which partially reflect the pulses back towards an optical receiver at which interference is observed. The nature of the interference observed at the optical receiver provides information on the optical path length the pulses traveled, which in turn provides information on parameters such as the strain the optical fiber experienced.

The circuitry that generates, modulates, and receives the sensing and reference pulses is typically contained within a device called an optical interrogator. There exists a continued desire to advance and improve technology used in optical interrogators.

SUMMARY

In a first aspect of the disclosure, there is provided an optical fiber interrogator for interrogating optical fiber comprising fiber Bragg gratings ("FBGs"), the interrogator comprising: (a) a light source operable to emit phase coherent light; (b) amplitude modulation circuitry optically coupled to the light source and operable to generate one or more light pulses from the light; (c) an optical splitter optically coupled to the amplitude modulation circuitry and being configured to split a light pulse received from the amplitude modulation circuitry into a pair of light pulses; (d) an optical delayer optically coupled to the optical splitter and configured to introduce a delay to one light pulse of the pair of light pulses relative to the other light pulse of the pair of light pulses; and (e) control circuitry comprising a controller, communicatively coupled to the amplitude modulation circuitry, and configured to perform a method for interrogating the optical fiber comprising generating a light pulse by using the amplitude modulation circuitry to modulate light emitted by the light source, wherein the generated light pulse is split into a pair of light pulses ("first and second light pulses") by the optical splitter, and wherein one of the light pulses is delayed relative to the other light pulse by the optical delayer.

The optical delayer may comprise a delay coil or a delay-on-chip circuit, such as one or more of those described at http://www.darpa.mil/news-events/2013-11-26.

The interrogator may further comprise a phase modulator optically coupled to the amplitude modulation circuitry and operable to introduce a phase shift to at least one of the first and second light pulses. The method may further comprise phase shifting one of the first and second light pulses relative to the other of the first and second light pulses by using the phase modulator.

The phase modulator may further comprise a solid state phase modulator. The phase modulator may be selected from the group consisting of a lithium niobate phase modulator, a gallium arsenide phase modulator, and an indium phosphide phase modulator.

The interrogator may further comprise (a) an output optical amplifier optically coupled to the phase modulator; (b) receiver circuitry; and (c) an optical circulator comprising first, second, and third ports, wherein the first port is optically coupled to the output optical amplifier, the second port is optically coupled to an output of the interrogator for respectively sending and receiving the pair of light pulses to and from the optical fiber, and the third port is optically coupled to the receiver circuitry for processing signals received from the optical fiber.

The interrogator may further comprise polarization maintaining fiber between the light source and the phase modulator such that a polarization of the light emitted by the light source is maintained from the light source to the phase modulator.

The interrogator may further comprise single mode fiber between the phase modulator and the output of the interrogator.

The interrogator may further comprise single mode fiber between the output of the interrogator and the receiver circuitry.

The interrogator may further comprise an optical combiner optically coupled to the optical delayer and the optical splitter. The optical combiner may be configured to receive the pair of lights pulses via respective inputs of the optical combiner, and transmit the pair of light pulses via a common output of the optical combiner.

The interrogator may further comprise an optical attenuator optically coupled between the third port of the optical circulator and the receiver circuitry, for attenuating an intensity of light input to the optical attenuator.

The interrogator may further comprise a polarization splitter optically coupled between the third port of the optical circulator and the receiver circuitry, for splitting light input to the polarization splitter as a function of a polarization of the incident light.

The interrogator may further comprise (a) receiver circuitry; and (b) an optical circulator comprising first, second, and third ports, wherein the first port is optically coupled to the phase modulator, the second port is optically coupled to an output of the interrogator for respectively sending and receiving the pair of light pulses to and from the optical fiber, and the third port is optically coupled to the receiver circuitry for processing signals received from the optical fiber.

The light source may comprise a laser having a power of at least 100 mW.

The phase shifting may comprise applying a positive phase shift to one of the light pulses ("the first light pulse"), and applying a negative phase shift to the other light pulse, intended to interfere with the first light pulse. The phase shifting may comprise phase shifting the sensing pulse by $2\pi$ and not phase shifting the reference pulse.

The first and second light pulses may differ in phase from each other by more than $\pi$ radians.

The method may further comprise: (a) generating a calibration pulse; (b) determining when reflections of the calibration pulse off the FBGs arrive at the receiver circuitry; and (c) based on differences in when the reflections of the calibration pulse arrive at the receiver circuitry, configuring the delay introduced by the optical delayer.

The phase shifting may comprise applying a non-linear phase shift or a piecewise linear phase shift to at least one of the first and second light pulses.

The phase shift may comprise a Barker code.

The method may further comprise dithering leakage from the amplitude modulation circuitry by phase shifting the leakage between 0 and $\pi$ radians at a frequency at least 2.5 times higher than a frequency at which interrogation is being performed.

The amplitude modulation circuitry may comprises (a) an input optical isolator and an output optical isolator isolating an input and output of the amplitude modulation circuitry, respectively; and (b) an input optical amplifier optically coupled between the input optical isolator and the output optical isolator.

The light source may comprise an electroabsorption modulated laser and the amplitude modulation circuitry comprises an absorption region of the electroabsorption modulated laser.

A first group of the FBGs may be tuned to reflect a wavelength of light different to a wavelength to which are tuned a second group of the FBGs, and wherein the light source is operable to emit multiple wavelengths of light for interrogating the first and second groups of the FBGS. The control circuitry may be further configured to perform the method for interrogating the optical fiber by using wavelength division multiplexing.

The controller may be configured to determine phase data from interference of reflections of the first light pulse off the FBGs with reflections of the second light pulse off the FBGs.

The interrogator may be configured to interrogate multiple optical fibers, the interrogator further comprising an outgoing optical switch optically coupled to the light source and comprising at least two switch outputs, the outgoing optical switch being operable to switch transmission of light between each of the at least two switch outputs, and wherein the control circuitry is further communicatively coupled to the outgoing optical switch and configured to perform the method for interrogating each of the multiple optical fibers, comprising: generating a light pulse by using the amplitude modulation circuitry to modulate light emitted by the light source, wherein the generated light pulse is split into a pair of light pulses ("first and second light pulses") by the optical splitter, and wherein one of the light pulses is delayed relative to the other light pulse by the optical delayer; and controlling the outgoing optical switch to switch transmission between the at least two switch outputs.

The interrogator may further comprise an incoming optical switch optically coupled to the receiver circuitry and comprising at least two switch inputs, the incoming optical switch being operable to switch transmission of light between each of the at least two switch inputs.

The control circuitry may be further communicatively coupled to the incoming optical switch and further configured to perform the method for interrogating each of the multiple optical fibers, comprising controlling the incoming optical switch to switch transmission between the at least two switch inputs.

The control circuitry may be further configured to perform the method for interrogating each of the multiple optical fibers, comprising controlling the outgoing optical switch to switch transmission between the at least two switch outputs, and controlling the incoming optical switch to switch transmission between the at least two switch inputs, such that the multiple optical fibers are interrogated at controllable duty cycles.

The interrogator may further comprise an accelerometer for obtaining acceleration data related to vibrations of the interrogator, wherein the controller is communicatively coupled to the accelerometer and configured to carry out a method comprising: receiving the acceleration data; determining a correlation between the acceleration data and the phase data; and adjusting the phase data as a function of the correlation so as to compensate for the vibrations.

The vibrations of the interrogator may comprise vibrations of one or more of: the delay coil, the light source, and the phase modulator.

The interrogator may further comprise comprising a temperature sensor for obtaining temperature data related to a temperature of the interrogator, wherein the controller is communicatively coupled to the temperature sensor and configured to carry out a method comprising: receiving the temperature data; determining a correlation between the temperature data and the phase data; and adjusting the phase data as a function of the correlation so as to compensate for the temperature.

The temperature of the interrogator may comprise a temperature of one or more of: the delay coil, the light source, and the phase modulator.

The interrogator may further comprise a GPS receiver, wherein the controller is configured to synchronize interrogation of the optical fiber as a function of a signal received from the GPS receiver, or another external synchronization signal.

The controller may be further configured to determine Lissajous data from interference of reflections of the first light pulse off the FBGs with reflections of the second light pulse off the FBGs.

The controller may be further configured to determine Lissajous data from the interference of reflections of the first light pulse off the FBGs with reflections of the second light pulse off the FBGs, during interrogation of the optical fiber.

The controller may be configured to assemble the phase data into data packets, each data packet comprising a key, a frame identifier and a payload comprising at least a portion of the phase data.

The controller may be configured to determine whether any of the data packets meet a data error condition and, if so, add an indication to the data packet that the data packet contains erroneous data.

The data error condition may be determined to be met if: the frame identifiers of consecutively assembled data packets do not meet a predetermined requirement; or the keys of consecutively assembled data packets do not meet a predetermined requirement.

The predetermined requirement may comprise the frame number of an earlier assembled data packet being one less than the frame number of the later, consecutively assembled data packet.

The predetermined requirement may comprise the key of one of the consecutively assembled data packets being separated from the key of the other of the consecutively assembled data packets by a preset number of bits.

The interrogator may be configured to transmit the data packets to a signal processing device communicatively coupled to the interrogator.

The interrogator and the computing device may be configured to communicate over a communication line with a throughput of at least 1 Gb/s.

In a further aspect of the disclosure, there is provided a system for interrogating optical fiber comprising fiber Bragg gratings ("FBGs"), the system comprising: (a) an optical fiber interrogator according to any of the above-described embodiments; and (b) one or more optical fiber segments optically coupled to the interrogator.

The system may further comprise an outgoing optical splitter and an incoming optical combiner, the outgoing optical splitter being optically coupled to the light source and being configured to split light received at the outgoing optical splitter and transmit the split light out each of multiple outputs of the outgoing optical splitter, and wherein the incoming optical combiner is optically coupled to the receiver circuitry and is configured to combine light received at each of multiple inputs of the incoming optical combiner and transmit the combined light to the receiver circuitry.

The system may further comprise one or more filter and balance units optically coupled to one or more of the multiple inputs of the incoming optical combiner.

The system may further comprise one or more optical circulators optically coupled to each of the one or more optical fiber segments, wherein, for each optical fiber segment, light sent from the interrogator to the optical fiber segment passes through the optical circulator, is reflected off the FBGs comprised in the optical fiber segment, and is redirected by the circulator to the receiver circuitry.

The system may further comprise one or more lead-in optical fiber segments optically coupling the interrogator to each of the one or more optical circulators, and one or more return optical fiber segments optically coupling each of the one or more optical circulators to the receiver circuitry.

The one or more lead-in optical fiber segments may be optically coupled to the multiple outputs of the outgoing optical splitter.

The one or more return optical fiber segments may be optically coupled to the multiple inputs of the incoming optical combiner.

The one or more return optical fiber segments may be optically coupled to the one or more filter and balance units.

In embodiments, the one or more lead-in optical fiber segments and the one or more return optical fiber segments do not comprise FBGs.

The interrogator may be communicatively coupled to a signal processing device configured to receive the data packets from the interrogator.

The signal processing device may be further configured to determine whether any of the data packets meet a data error condition and, if so, add an indication to the data packet that the data packet contains erroneous data.

The data error condition may be determined to be met if: the frame identifiers of consecutively assembled data packets do not meet a predetermined requirement; or the keys of consecutively assembled data packets do not meet a predetermined requirement.

The predetermined requirement may comprise the frame number of an earlier assembled data packet being one less than the frame number of the later, consecutively assembled data packet.

The predetermined requirement may comprise the key of one of the consecutively assembled data packets being separated from the key of the other of the consecutively assembled data packets by a preset number of bits.

The signal processing device may be configured to extract the phase data from the data packet if no data error condition is met.

In a further aspect of the disclosure, there is provided a method for interrogating optical fiber comprising fiber Bragg gratings ("FBGs"), using an optical fiber interrogator, the method comprising: (a) generating an initial light pulse from phase coherent light emitted from a light source, wherein the initial light pulse is generated by modulating the intensity of the light; (b) splitting the initial light pulse into a pair of light pulses; (c) causing one of the light pulses to be delayed relative to the other of the light pulses; (d) transmitting the light pulses along the optical fiber; (e) receiving reflections of the light pulses off the FBGs; and (f) determining whether an optical path length between the FBGs has changed from an interference pattern resulting from the reflections of the light pulses.

Determining whether the optical path length has changed may comprise converting the interference pattern from an optical to an electrical signal.

The method may further comprise phase shifting at least one of the light pulses relative to the other of the light pulses.

The phase shifting may be carried out using a phase modulator. The phase modulator may be a solid state phase modulator.

The phase modulator may be selected from the group consisting of a lithium niobate phase modulator, a gallium arsenide phase modulator, and an indium phosphide phase modulator.

A polarization of the light pulses may be maintained from when the initial light pulse is generated until the at least one of the light pulses is phase shifted.

Single mode fiber may be used to optically couple the phase modulator and an output of the interrogator.

The method may further comprise splitting the reflected light pulses as a function of a polarization of the reflected light pulses, prior to converting the interference patterns.

The light source may be a laser and an intensity of the light may be modulated using an input optical amplifier external of and optically coupled to the laser.

The light may be generated by an electroabsorption modulated laser and the intensity of the light may be modulated using an absorption region comprising part of the laser.

The light source may comprise a laser having a power of at least 100 mW.

The phase shifting may comprise applying a positive phase shift to one of the light pulses ("the first light pulse"), and applying a negative phase shift to the other of the light pulses ("the second light pulse"), so that the first light pulse may interfere with the second light pulse.

The first and second light pulses may differ in phase from each other by more than $\pi$ radians.

The method may further comprise (a) transmitting a calibration pulse to the FBGs; (b) receiving reflections of the calibration pulse off the FBGs; and (c) based on differences in when the reflections of the calibration pulse are received, determining, or configuring, the delay between the pair of light pulses.

The phase shifting may comprise applying a nonlinear phase shift or a piecewise linear phase shift to at least one of the light pulses. The phase shift may comprise a Barker code.

The method may further comprise dithering leakage from the light source by phase shifting the leakage between 0 and π radians at a frequency at least 2.5 times higher than a frequency at which interrogation is being performed.

The interrogator may configured to interrogate multiple optical fibers, the interrogator further comprising an outgoing optical switch optically coupled to the light source and comprising at least two switch outputs, and The method may further comprise, for each optical fiber: generating an initial light pulse from phase coherent light emitted from the light source, wherein the light pulse is generated by modulating the intensity of the light; splitting the initial light pulse into a pair of light pulses; causing one of the light pulses to be delayed relative to the other of the light pulses; and controlling the outgoing optical switch to switch transmission between the at least two switch outputs.

The interrogator may further comprise an incoming optical switch optically coupled to receiver circuitry and comprising at least two switch inputs, the incoming optical switch being operable to switch transmission of light between each of the at least two switch inputs.

The method may further comprise controlling the incoming optical switch to switch transmission between the at least two switch inputs.

The method may further comprise controlling the outgoing optical switch to switch transmission between the at least two switch outputs, and controlling the incoming optical switch to switch transmission between the at least two switch inputs, such that the multiple optical fibers are interrogated at controllable duty cycles.

A first group of the FBGs may be tuned to reflect a wavelength of light different to a wavelength to which are tuned a second group of the FBGs, and wherein the light source may be operable to emit multiple wavelengths of light for interrogating the first and second groups of the FBGS, and the method may further comprise using wavelength division multiplexing to distinguish the reflections of the light pulses off the FGBs.

An outgoing optical splitter may be optically coupled to the light source and may be configured to split light received at the outgoing optical splitter and transmit the split light out each of multiple outputs of the outgoing optical splitter, wherein an incoming optical combiner may be optically coupled to receiver circuitry and may be configured to combine light received at each of multiple inputs of the incoming optical combiner and transmit the combined light to the receiver circuitry.

The method may further comprise determining phase data from interference of reflections of the first light pulse off the FBGs with reflections of the second light pulse off the FBGs.

The method may further comprise: receiving acceleration data related to vibrations of the interrogator; determining a correlation between the acceleration data and the phase data; and
  adjusting the phase data as a function of the correlation so as to compensate for the vibrations.

The vibrations of the interrogator may comprise vibrations of one or more of: the delay coil, the light source, and the phase modulator.

The method may further comprise receiving temperature data related to a temperature of the interrogator; determining a correlation between the temperature data and the phase data; and adjusting the phase data as a function of the correlation so as to compensate for the temperature.

The temperature of the interrogator may comprise a temperature of one or more of: the delay coil, the light source, and the phase modulator.

The method may further comprise synchronizing interrogation of the optical fiber as a function of a signal received from a GPS receiver.

The method may further comprise determining Lissajous data from interference of reflections of the first light pulse off the FBGs with reflections of the second light pulse off the FBGs.

The method may further comprise determining Lissajous data from the interference of reflections of the first light pulse off the FBGs with reflections of the second light pulse off the FBGs, during interrogation of the optical fiber.

The method may further comprise assembling the phase data into data packets, each data packet comprising a key, a frame identifier and a payload comprising at least a portion of the phase data.

The method may further comprise determining whether any of the data packets meet a data error condition and, if so, adding an indication to the data packet that the data packet contains erroneous data.

Determining the data error condition may comprise: determining whether the frame identifiers of consecutively assembled data packets do not meet a predetermined requirement; or determining whether the keys of consecutively assembled data packets do not meet a predetermined requirement.

The predetermined requirement may comprise the frame number of an earlier assembled data packet being one less than the frame number of the later, consecutively assembled data packet.

The predetermined requirement may comprise the key of one of the consecutively assembled data packets being separated from the key of the other of the consecutively assembled data packets by a preset number of bits.

The method may further comprise, if an erroneous condition is not met, extracting the phase data from the data packet and store the extracted phase data.

The method may further comprise transmitting the data packets to a signal processing device separate from the interrogator.

The method may further comprise using the signal processing device to extract the phase data if no data error condition is met.

The interrogator and the signal processing device may be configured to communicate over a communication line with a throughput of at least 1 Gb/s.

In a further aspect of the disclosure, there is provided a non-transitory computer readable medium having stored thereon program code to cause a processor to perform a method for interrogating optical fiber comprising fiber Bragg gratings ("FBGs"), using an optical fiber interrogator, according to any of the above-described embodiments.

This summary does not necessarily describe the entire scope of all aspects.

Other aspects, features and advantages will be apparent to those of ordinary skill in the art upon review of the following description of specific embodiments.

BRIEF DESCRIPTION OF THE DRAWINGS

In the accompanying drawings, which illustrate one or more example embodiments:

FIG. 9 is a schematic of multiple optical fiber segments forming the sensor loads of FIG. 8, according to one embodiment.

DETAILED DESCRIPTION

Directional terms such as "top", "bottom", "upwards", "downwards", "vertically", and "laterally" are used in the following description for the purpose of providing relative reference only, and are not intended to suggest any limitations on how any article is to be positioned during use, or to be mounted in an assembly or relative to an environment. Additionally, the term "couple" and variants of it such as "coupled", "couples", and "coupling" as used in this description are intended to include indirect and direct connections unless otherwise indicated. For example, if a first device is coupled to a second device, that coupling may be through a direct connection or through an indirect connection via other devices and connections. Similarly, if the first device is communicatively coupled to the second device, communication may be through a direct connection or through an indirect connection via other devices and connections.

Optical interferometry is a technique in which two separate light pulses are generated: a sensing pulse and a reference pulse. These pulses may be generated by an optical source such as a laser. When optical interferometry is used for fiber optic sensing applications, the sensing and reference pulses are at least partially reflected back towards an optical receiver. Optical interferometry has a variety of applications, one of which is being used to detect dynamic strain.

Figure 1A:
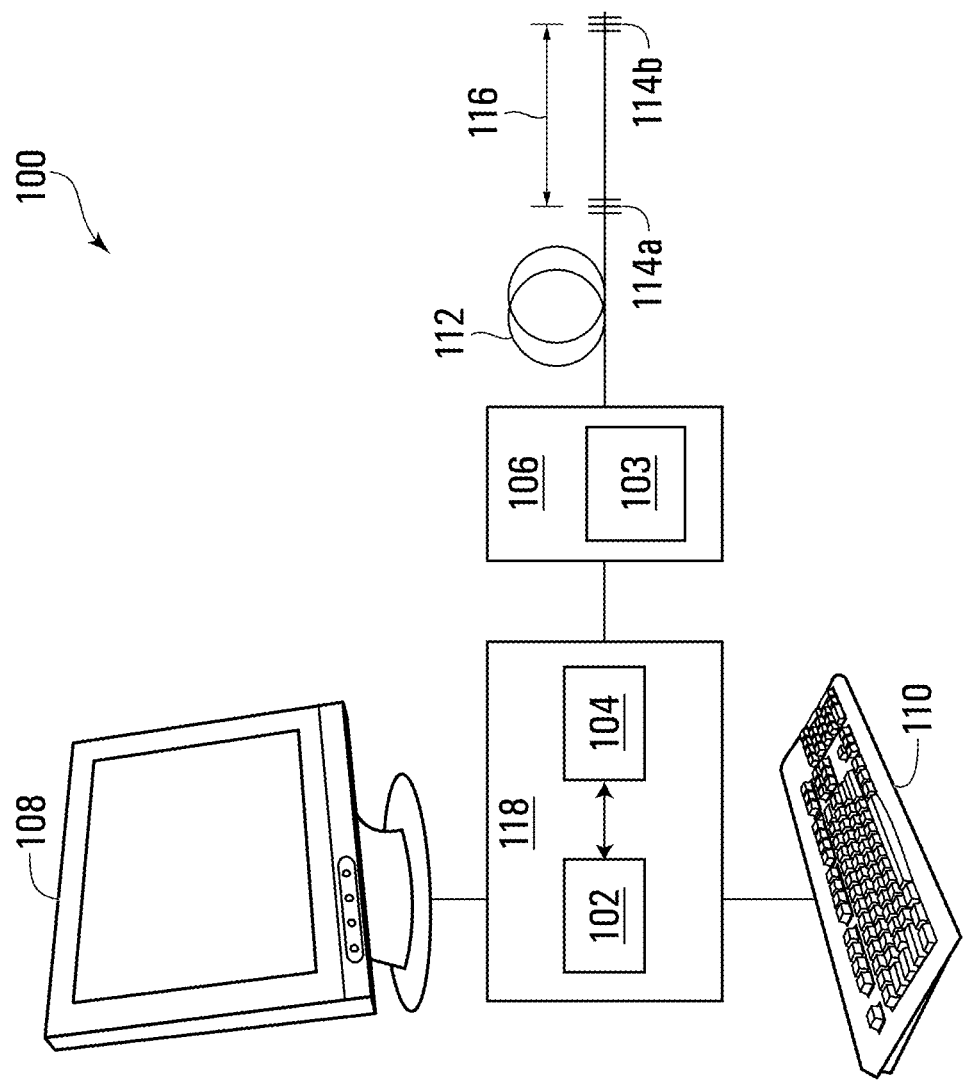
FIG. 1A is a block diagram of a system for detecting dynamic strain, which includes an optical fiber with fiber Bragg gratings ("FBGs") for reflecting a light pulse, according to one embodiment.

Referring now to FIG. 1A, there is shown one embodiment of a system 100 for performing interferometry using fiber Bragg gratings ("FBGs"). The system 100 comprises optical fiber 112, an interrogator 106 optically coupled to the optical fiber 112, and a signal processing device 118 that is communicative with the interrogator 106.

The optical fiber 112 comprises one or more fiber optic strands, each of which is made from quartz glass (amorphous $SiO_2$). The fiber optic strands are doped with various elements and compounds (including germanium, erbium oxides, and others) to alter their refractive indices, although in alternative embodiments the fiber optic strands may not be doped. Single mode and multimode optical strands of fiber are commercially available from, for example, Corning® Optical Fiber. Example optical fibers include ClearCurve™ fibers (bend insensitive), SMF28 series single mode fibers such as SMF-28 ULL fibers or SMF-28e fibers, and InfmiCor® series multimode fibers.

The interrogator 106 generates the sensing and reference pulses and outputs the reference pulse after the sensing pulse. The pulses are transmitted along optical fiber 112 that comprises a first pair of FBGs. The first pair of FBGs comprises first and second FBGs 114a,b (generally, "FBGs 114"). The first and second FBGs 114a,b are separated by a certain segment 116 of the optical fiber 112 ("fiber segment 116"). The optical length of the fiber segment 116 varies in response to dynamic strain that the fiber segment 116 experiences.

The light pulses have a wavelength identical or very close to the center wavelength of the FBGs 114, which is the wavelength of light the FBGs 114 are designed to partially reflect; for example, typical FBGs 114 are tuned to reflect light in the 1,000 to 2,000 nm wavelength range. The sensing and reference pulses are accordingly each partially reflected by the FBGs 114a,b and return to the interrogator 106. The delay between transmission of the sensing and reference pulses is such that the reference pulse that reflects off the first FBG 114a (hereinafter the "reflected reference pulse") arrives at the optical receiver 103 simultaneously with the sensing pulse that reflects off the second FBG 114b (hereinafter the "reflected sensing pulse"), which permits optical interference to occur.

While FIG. 1A shows only the one pair of FBGs 114a,b, in alternative embodiments (not depicted) any number of FBGs 114 may be on the fiber 112, and time division multiplexing (TDM) (and, optionally, wavelength division multiplexing (WDM)) may be used to simultaneously obtain measurements from them. If two or more pairs of FBGs 114 are used, any one of the pairs may be tuned to reflect a different center wavelength than any other of the pairs. Alternatively, a group of multiple FBGs 114 may be tuned to reflect a different center wavelength to another group of multiple FBGs 114, and there may be any number of groups of multiple FBGs extending along the optical fiber 112 with each group of FBGs 114 tuned to reflect a different center wavelength. In these example embodiments where different pairs or group of FBGs 114 are tuned to reflect different center wavelengths to other pairs or groups of FBGs 114, WDM may be used in order to transmit and to receive light from the different pairs or groups of FBGs 114, effectively extending the number of FBG pairs or groups that can be used in series along the optical fiber 112 by reducing the effect of optical loss that otherwise would have resulted from light reflecting from the FBGs 114 located on the fiber 112 nearer to the interrogator 106. When different pairs of the FBGs 114 are not tuned to different center wavelengths, TDM is sufficient.

The interrogator 106 emits laser light with a wavelength selected to be identical or sufficiently near the center wavelength of the FBGs 114, and each of the FBGs 114 partially reflects the light back towards the interrogator 106. The timing of the successively transmitted light pulses is such that the light pulses reflected by the first and second FBGs 114a,b interfere with each other at the interrogator 106, which records the resulting interference signal. The strain that the fiber segment 116 experiences alters the optical path length between the two FBGs 114 and thus causes a phase difference to arise between the two interfering pulses. The resultant optical power at the optical receiver 103 can be used to determine this phase difference. Consequently, the interference signal that the interrogator 106 receives varies with the strain the fiber segment 116 is experiencing, which allows the interrogator 106 to estimate the strain the fiber segment 116 experiences from the received optical power. The interrogator 106 digitizes the phase difference ("output signal") whose magnitude and frequency vary directly with the magnitude and frequency of the dynamic strain the fiber segment 116 experiences.

The signal processing device 118 is communicatively coupled to the interrogator 106 to receive the output signal. The signal processing device 118 includes a processor 102 and a non-transitory computer-readable medium 104 that are communicatively coupled to each other. An input device 110 and a display 108 interact with the processor 102. The computer-readable medium 104 has stored on it program code to cause the processor 102 to perform any suitable signal processing methods to the output signal. For example, if the fiber segment 116 is laid adjacent a region of interest that is simultaneously experiencing vibration at a rate under 20 Hz and acoustics at a rate over 20 Hz, the fiber segment 116 will experience similar strain and the output signal will comprise a superposition of signals representative of that vibration and those acoustics. The processor 102 may apply to the output signal a low pass filter with a cut-off frequency of 20 Hz, to isolate the vibration portion of the output signal from the acoustics portion of the output signal. Analogously, to isolate the acoustics portion of the output signal from the vibration portion, the processor 102 may apply a high-pass filter with a cut-off frequency of 20 Hz. The processor 102 may also apply more complex signal processing methods to the output signal; example methods include those described in PCT application PCT/CA2012/000018 (publication number WO 2013/102252), the entirety of which is hereby incorporated by reference.

Figure 1B:
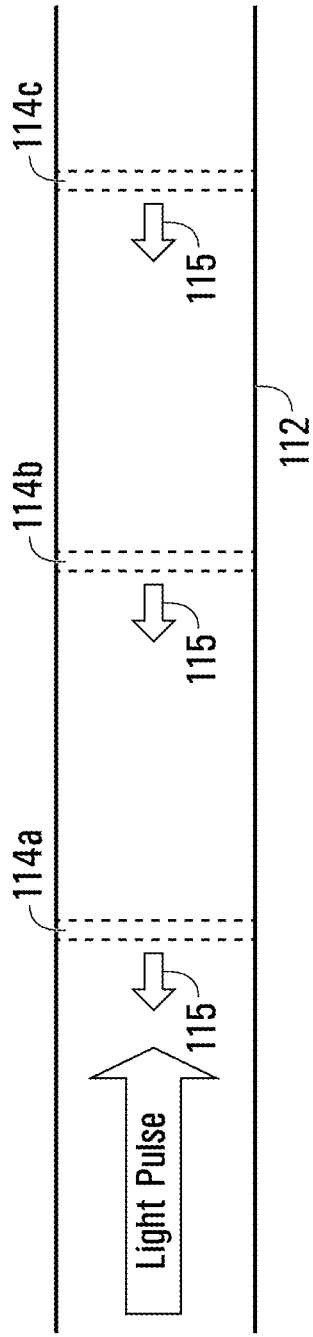
FIG. 1B is a schematic that depicts how the FBGs reflect a light pulse.
Figure 1C:
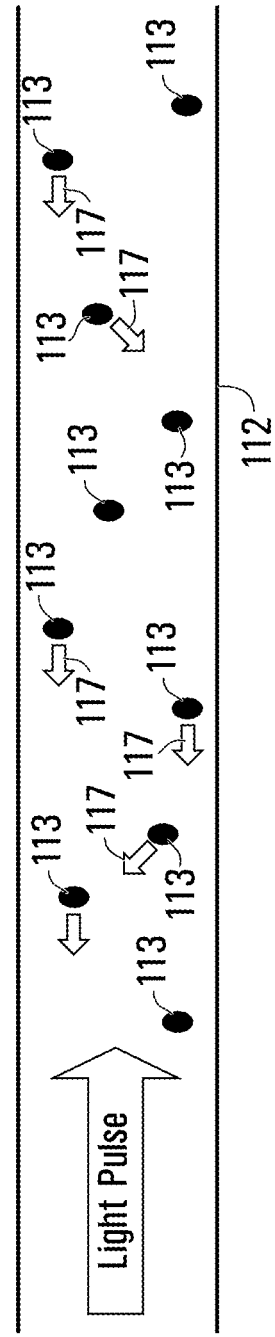
FIG. 1C is a schematic that depicts how a light pulse interacts with impurities in an optical fiber that results in scattered laser light due to Rayleigh scattering, which is used for distributed acoustic sensing ("DAS").

FIG. 1B depicts how the FBGs 114 reflect the light pulse, according to another embodiment in which the optical fiber 112 comprises a third FBG 114c. In FIG. 1B, the second FBG 114b is equidistant from each of the first and third FBGs 114a,c when the fiber 112 is not strained. The light pulse is propagating along the fiber 112 and encounters three different FBGs 114, with each of the FBGs 114 reflecting a portion 115 of the pulse back towards the interrogator 106. In embodiments comprising three or more FBGs 114, the portions of the sensing and reference pulses not reflected by the first and second FBGs 114a,b can reflect off the third FBG 114c and any subsequent FBGs 114, resulting in interferometry that can be used to detect strain along the fiber 112 occurring further from the interrogator 106 than the second FBG 114b. For example, in the embodiment of FIG. 1B, a portion of the sensing pulse not reflected by the first and second FBGs 114a,b can reflect off the third FBG 114c, and a portion of the reference pulse not reflected by the first FBG 114a can reflect off the second FBG 114b, and these reflected pulses can interfere with each other at the interrogator 106.

Any changes to the optical path length of the fiber segment 116 result in a corresponding phase difference between the reflected reference and sensing pulses at the interrogator 106. Since the two reflected pulses are received as one combined interference pulse, the phase difference between them is embedded in the combined signal. This phase information can be extracted using proper signal processing techniques, such as phase demodulation. The relationship between the optical path of the fiber segment 116 and that phase difference (Θ) is as follows:

$$\Theta = 2\pi n L/\lambda,$$

where n is the index of refraction of the optical fiber; L is the physical path length of the fiber segment 116; and λ is the wavelength of the optical pulses. A change in nL is caused by the fiber experiencing longitudinal strain induced by energy being transferred into the fiber. The source of this energy may be, for example, an object outside of the fiber experiencing dynamic strain, undergoing vibration, or emitting energy. As used herein, "dynamic strain" refers to strain that changes over time. Dynamic strain that has a frequency of between about 5 Hz and about 20 Hz is referred to by persons skilled in the art as "vibration", dynamic strain that has a frequency of greater than about 20 Hz is referred to by persons skilled in the art as "acoustics", and dynamic strain that changes at a rate of <1 Hz, such as at 500 μHz, is referred to as "sub-Hz strain".

Figure 10:
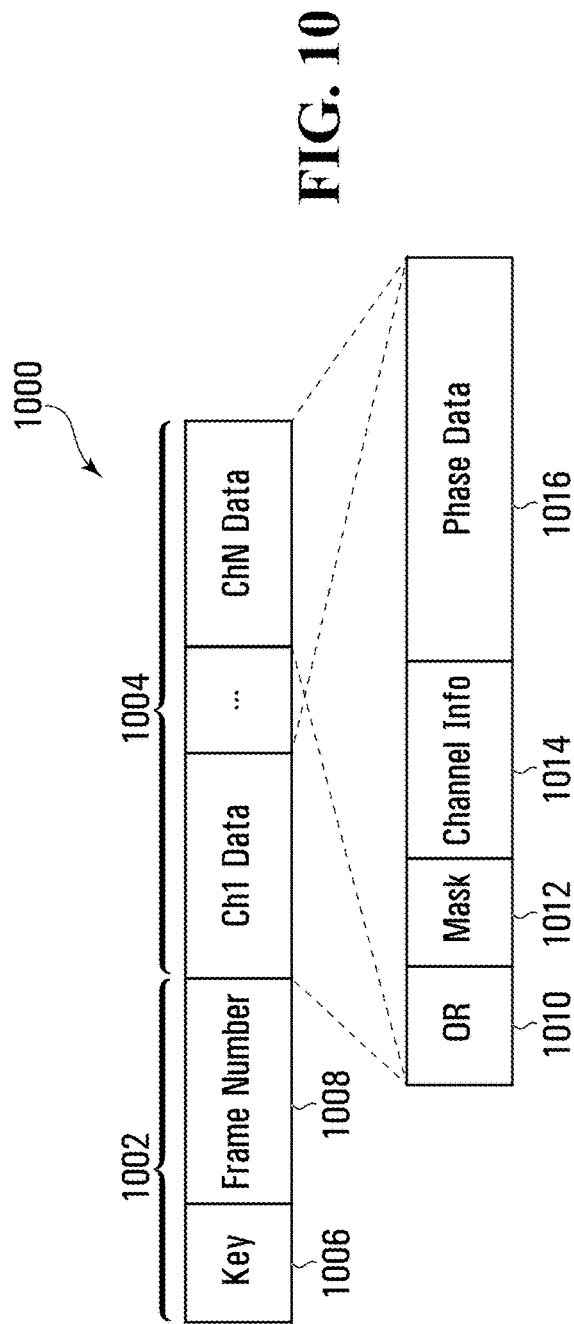
FIG. 10 is a schematic of a data packet, according to one embodiment.

One conventional way of determining Δ nL is by using what is broadly referred to as distributed acoustic sensing ("DAS"). DAS involves laying the fiber 112 through or near a region of interest and then sending a coherent laser pulse along the fiber 112. As shown in FIG. 10, the laser pulse interacts with impurities 113 in the fiber 112, which results in scattered laser light 117 because of Rayleigh scattering. Vibration or acoustics emanating from the region of interest results in a certain length of the fiber becoming strained, and the optical path change along that length varies directly with the magnitude of that strain. Some of the scattered laser light 117 is back-scattered along the fiber 112 and is directed towards the optical receiver 103, and depending on the amount of time required for the scattered light 117 to reach the receiver and the phase of the scattered light 117 as determined at the receiver, the location and magnitude of the vibration or acoustics can be estimated with respect to time. DAS relies on interferometry using the reflected light to estimate the strain the fiber experiences. The amount of light that is reflected is relatively low because it is a subset of the scattered light 117. Consequently, and as evidenced by comparing FIGS. 1B and 10, Rayleigh scattering transmits less light back towards the optical receiver 103 than using the FBGs 114.

DAS accordingly uses Rayleigh scattering to estimate the magnitude, with respect to time, of the strain experienced by the fiber during an interrogation time window, which is a proxy for the magnitude of the vibration or acoustics emanating from the region of interest. In contrast, the embodiments described herein measure dynamic strain using interferometry resulting from laser light reflected by FBGs 114 that are added to the fiber 112 and that are designed to reflect significantly more of the light than is reflected as a result of Rayleigh scattering. This contrasts with an alternative use of FBGs 114 in which the center wavelengths of the FBGs 114 are monitored to detect any changes that may result to it in response to strain. In the depicted embodiments, groups of the FBGs 114 are located along the fiber 112. A typical FBG can have a reflectivity rating of between 0.1% and 5%. The use of FBG-based interferometry to measure dynamic strain offers several advantages over DAS, in terms of optical performance.

Figure 2:
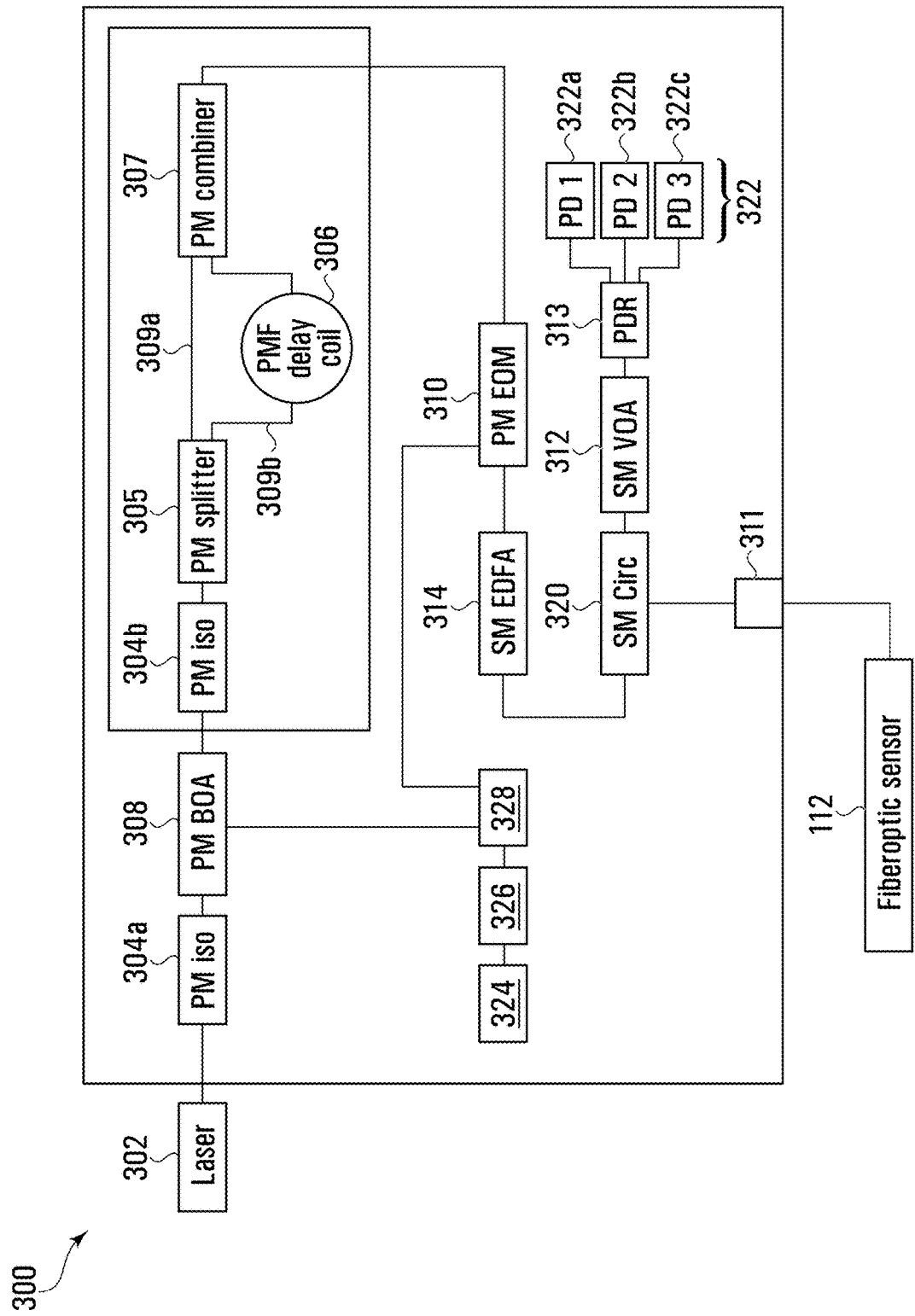
FIG. 2 is a schematic of an optical interrogator for performing interferometry using FBGs, according to one embodiment.

Referring now to FIG. 2, there is shown an optical interrogator 300 for performing interferometry using FBGs, according to one embodiment. The interrogator 300 comprises a light source in the form of a laser 302 whose output is optically coupled in series to various optical components; in order from the laser 302 these components are an input optical isolator 304a, an input optical amplifier 308, an output optical isolator 304b, an optical splitter 305, a delay coil 306, an optical combiner 307, a phase modulator 310, an output optical amplifier 314, and a first port of an optical circulator 320. A second port of the optical circulator 320 is optically coupled to the interrogator's output 311. Optically coupled to the interrogator's output 311 is the optical fiber 112 comprising the FBGs 114 (not shown). A third port of the optical circulator 320 is optically coupled to a variable optical attenuator 312 which in turn is coupled to a polarization splitter 313. Polarization splitter 313 splits incoming light according to its polarization, and in the present embodiment splits and sends incoming light towards receiver circuitry 322, comprising photodiodes 322a-c. In the depicted embodiment, receiver circuitry 322 converts reflected light pulses into electrical signals, but in alternative embodiments may convert the reflected light pulses into a different type of signal, such as an acoustic signal. The optical circulator 320 directs light pulses entering its first port out its second port, and directs light pulses entering its second port out its third port. The effect of this is that the sensing and reference pulses are transmitted from the output optical amplifier 314 to the FBGs 114, while reflected pulses are transmitted from the FBGs 114 to the receiver circuitry 322. The optical fiber 112 is used to optically couple the components that comprise the laser 302, optical isolator 304a, optical amplifier 308, optical isolator 304b, optical splitter 305, delay coil 306, optical combiner 307, phase modulator 310, optical amplifier 314, optical circulator 320, optical attenuator 312, polarization splitter 313, and receiver circuitry 322. However, in an alternative embodiment (not depicted), an alternative to the optical fiber 112 may be used to optically couple the various components together; for example, free space optical communication may be used to optically couple the various components together. In another alternative embodiment (not depicted), the optical circulator 320 may be replaced with a package comprising an optical coupler and an optical isolator.

In FIG. 2, the laser 302 outputs phase coherent light to permit the sensing and reflected pulses to interfere with each other after being reflected by the FBGs 114. Additionally, while the laser 302 is the light source in the depicted embodiment, alternative embodiments (not depicted) may comprise a non-laser coherent light source.

The interrogator 300 also comprises a controller 324 communicatively coupled to the input optical amplifier 308 and to the phase modulator 310 via a digital to analog converter 326 ("DAC 326") and an analog amplifier 328. The controller 324 is consequently able to control the amplitude of the light pulse generated by the laser 302, as well as the phase modulation of the sensing and reference pulses. The controller 324 is configured to perform a method for interrogating the FBGs 114 or for calibrating the interrogator 300, such as the example methods shown in FIGS. 7 and 13 and described in more detail, below. The controller 324 in the depicted embodiment is a field programmable gate array ("FPGA"), which is configured using a hardware description language such as VHDL or Verilog from which a netlist is generated and used to configure the FPGA in the field. The DAC 326 and analog amplifier 328 allow the controller 324 to output all digital signals and still be able to control the first optical amplifier 308 and phase modulator 310; in an alternative embodiment (not depicted) some or all of the signals the controller 324 outputs may be analog signals and the controller 324 may consequently be directly communicatively coupled to one or both of the amplifier 308 and phase modulator 310. Alternatively, one or both of the amplifier 308 and phase modulator 310 may be configured to receive digital input signals, in which case the controller 324 may be directly communicatively coupled to one or both of the amplifier 308 and phase modulator 310 if the controller 324 also outputs at least some digital signals. As another alternative (not depicted), one or both of the amplifier 308 and the phase modulator 310 may be configured to receive analog signals, the controller 324 may be configured to output at least some analog signals, and the controller 324 may be communicatively coupled to one or both of the amplifier 308 and phase modulator via an analog to digital converter and, optionally, a digital amplifier.

In this depicted embodiment, the laser 302 generates light centered on 1,550 nm and has a narrow line width and a long coherence length. The input optical isolator 304a prevents back reflections from destabilizing the laser 302. In this example embodiment the input optical amplifier 308 is a semiconductor optical amplifier ("SOA"). The output optical isolator 304b prevents back reflections from destabilizing the first optical amplifier 308. Optical splitter 305 is configured to split laser light incident thereon, and send separate pulses along upper and lower optical paths 309a and 309b. Delay coil 306 is responsible for introducing a delay in the light pulse passing along lower optical path 309b relative to the light pulse passing along upper optical path 309a. The pair of light pulses (the sensing and reference pulses), delayed relative to each other, are transmitted along a common optical path once they arrive at optical combiner 307. The phase modulator 310, which in this example embodiment is a solid state lithium niobate phase modulator, allows the controller 324 to control phase modulation of one or both of the sensing and reference pulses. The output optical amplifier 314 boosts the power of the sensing and reference pulses for transmission to the FBGs 114; in this example embodiment, the output optical amplifier 314 is an erbium doped fiber amplifier ("EDFA").

Example component manufacturers are Covega™ Technologies for the input optical amplifier 308 and the phase modulator 310, Nuphoton™ Technologies, Inc. for the output optical amplifier 314, OSI™ Laser Diode Inc. for the receiver circuitry 322, OZ Optics™ Ltd. for the circulator 320, and Thorlabs™, Inc. for the optical isolators 304a,b.

Figure 7:
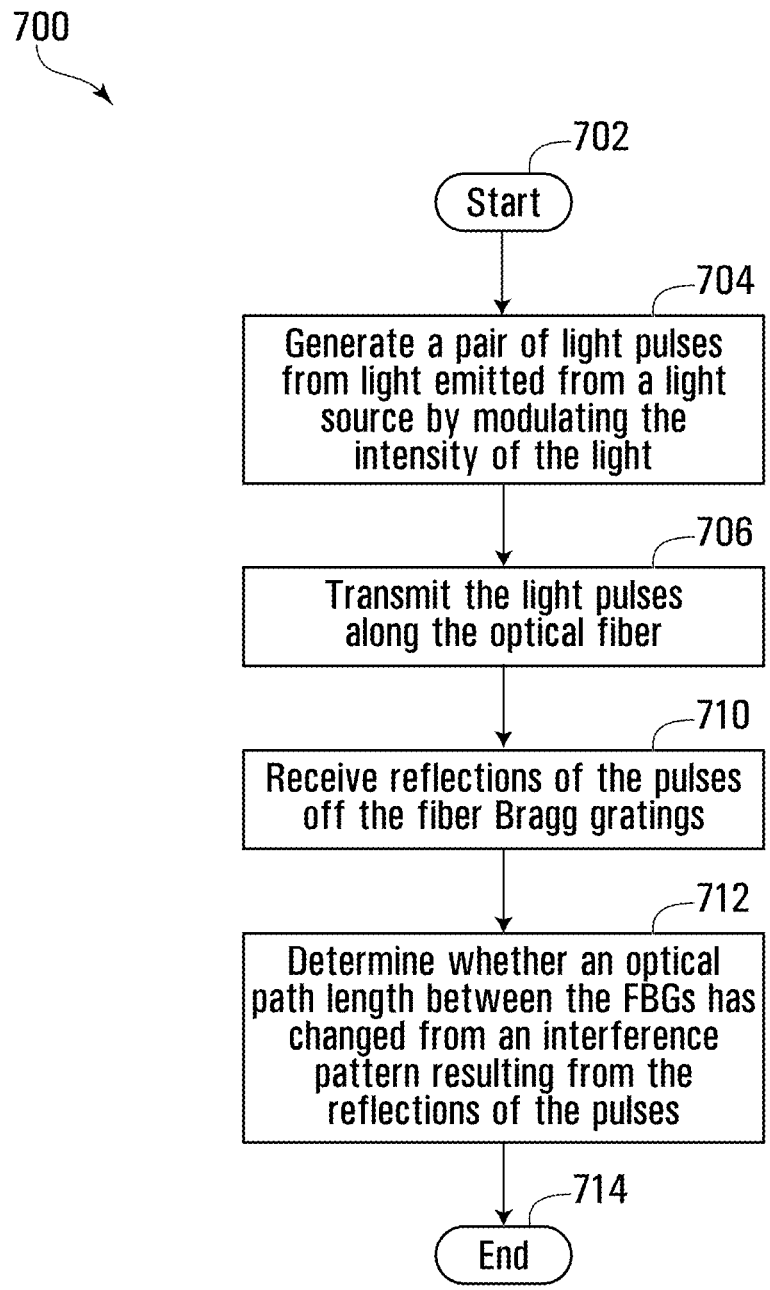
FIG. 7 is a method for interrogating optical fiber that comprises FBGs, according to one embodiment.

Referring now to FIG. 7, there is shown a method 700 for interrogating the optical fiber 112, according to another embodiment. As mentioned above, the method 700 is encoded on to the FPGA that comprises the controller 324 as a combination of FPGA elements such as logic blocks. The controller 324 begins performing the method 700 at block 702 and proceeds to block 704 where it generates a light pulse using light emitted from a light source by modulating the intensity of the light. To generate the pulse, the controller 324 controls the input optical amplifier 308 to modulate the amplitude of the light the laser 302 emits. Optical splitter 305 causes the light pulse to be split into a pair of light pulses, and subsequently delay coil 306 induces a delay in one pulse relative to the other pulse. These light pulses are the sensing and reference pulses and the light source is the laser 302.

The pulses are amplified by the output optical amplifier 314 and are transmitted through the optical circulator 320 and to the optical fiber 112 and the FBGs 114 (block 706).

The pulses are then reflected off the FBGs 114 and return to the interrogator 300 (block 708) where they are directed via the optical circulator 320 to the receiver circuitry 322, which in the depicted embodiment converts the interference pattern resulting from the reflections into an electrical signal. The interference patterns resulting from the reflections are then observed, such as at the signal processing software 118, and an operator of the interrogator 300 can determine whether the optical path length between the FBGs 114 has changed from the interference pattern that results from interference of the reflections (block 710). For example, the operator can make determinations about the nature of the dynamic strain experienced by the fiber segments 116 between the FBGs 114.

In some alternative embodiments, between blocks 704 and 706 the controller 324 phase shifts one of the light pulses relative to the other of the light pulses; that is, in the example embodiment in which the sensing and reference pulses are generated, the controller 324 causes the phase modulator 310 to phase shift one or both of the sensing and reference pulses. When the phase modulator 310 is a lithium niobate phase modulator, the modulator 310 is able to introduce a phase shift of up to $+/-\pi$ to one or both of the sensing and reference pulses; by introducing a phase shift of as much as $+\pi$ to one of the pulses and as much as $-\pi$ to the other of the pulses, the controller 324 can introduce a phase difference of anywhere from 0 to $2\pi$ between the pulses.

In contrast to a conventional piezoelectric fiber stretcher, using a lithium niobate phase modulator permits faster phase modulation rates (in the depicted embodiment, the phase modulator 308 can modulate at up to 10 GHz, and alternative and commercially available phase modulators 308 can modulate at up to 40 GHz), introduces less noise, and permits nonlinear and piecewise modulation schemes. For example, any of a sinusoidal, sawtooth, triangle, and stepwise function can be used to drive the phase modulator 310, with the light pulses being modulated accordingly. In another alternative embodiment, a Barker code may be used for phase modulation.

As alluded to above in respect of FIG. 1A, in some alternative embodiments (not depicted) the fiber 112 may comprise groups of two or more of the FBGs 114, with these groups located at different positions along the fiber 112 and with the FBGs 114 in any one of these groups tuned to a common center wavelength that is different from the center wavelength to which the FBGs 114 in the other groups are tuned. For example, there may be a first group of three FBGs 114 along the fiber 112 extending from 200 m to 600 m from the interrogator 300 and tuned to a first center wavelength, a second group of three FBGs 114 along the fiber 112 extending from 600 m to 1000 m from the interrogator 300 and tuned to a second center wavelength different from the first center wavelength, and a third group of three FBGs 114 along the fiber 112 extending from 1000 m to 1400 m from the interrogator 300 and tuned to a third center wavelength different from the first and second center wavelengths. In this example, the controller 324 may be configured to cause the interrogator 300 to use TDM to interrogate each of these three different groups of FBGs 114 using pulses of the three different wavelengths of light launched from the interrogator 300 at different times. For example, a first pulse at the first center wavelength may be launched for the first group of FBGs 114 at times t1 and t2, a second pulse at the second center wavelength may be launched for the second group of FBGs 114 at times t3 and t4, and a third pulse at the third center wavelength may be launched for the third group of FBGs 114 at times t5 and t6, with t1<t2<t3<t4<t5<t6. In this manner, different wavelengths of light may be used to interrogate different lengths of the fiber 112. In an alternative embodiment, light pulses having different wavelengths may be simultaneously launched into the fiber 112; in this embodiment and applying the terminology of the immediately preceding example, t1=t3=t5 and t2=t4, with each of t1, t3, and t5>t2, t4, and t6.

Figure 4:
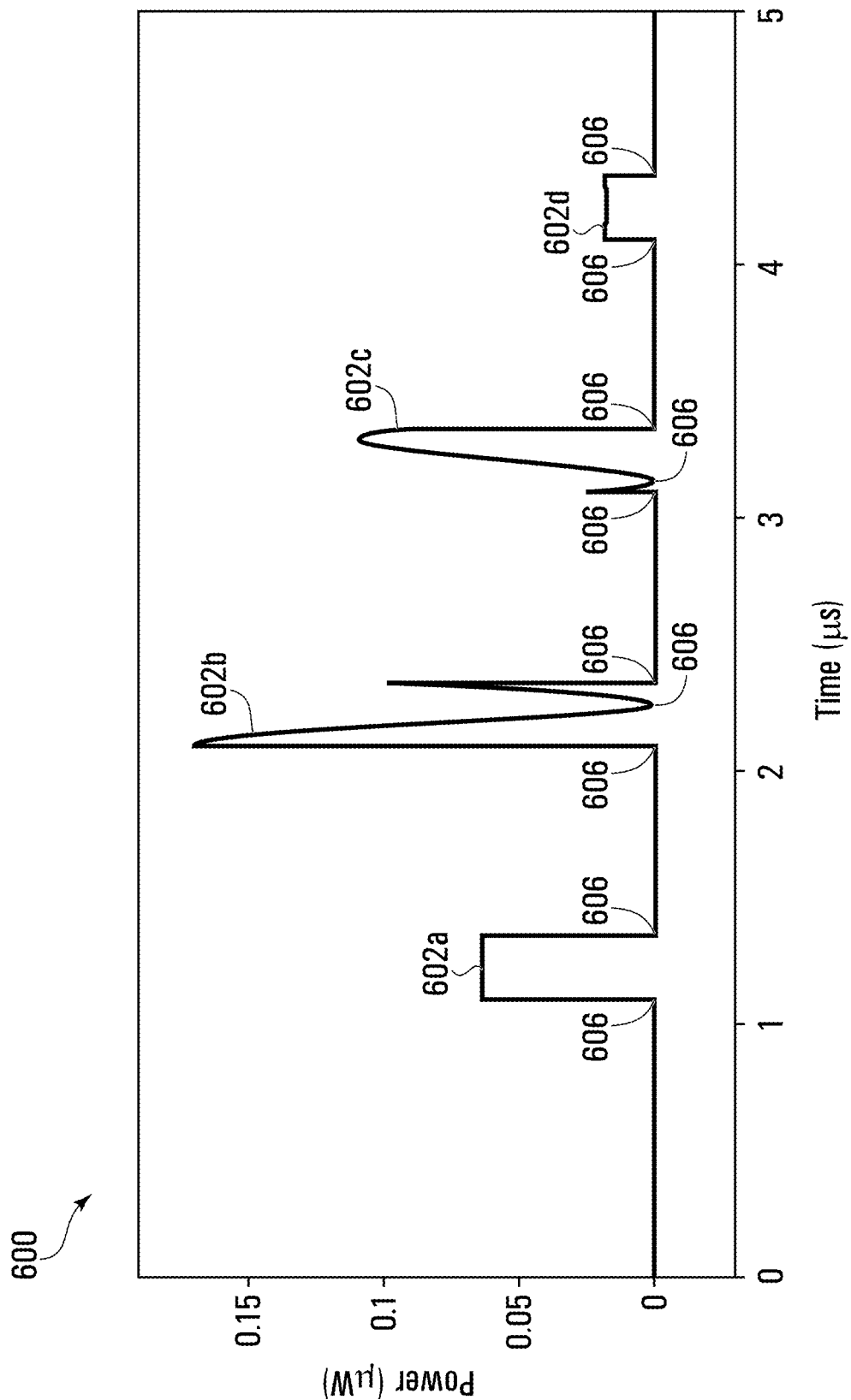
FIG. 4 is a graph of example pulses resulting from reflections of sensing and reference pulses off of the FBGs.

Example interference patterns are depicted in FIG. 4. FIG. 4 shows a graph 600 of first through fourth pulses 602a-d (collectively, "pulses 602") resulting from reflections off of the FBGs 114 of the sensing and reference pulses generated using the interrogator 300 of FIG. 2. The pulses 602 are measured after the receiver circuitry 322 has converted the reflections from an optical to an electrical signal.

The graph 600 is generated by interrogating three of the FBGs 114: the first and second FBGs 114a,b and a third FBG 114 located along the optical fiber 112 further from the interrogator 300 than the second FBG 114b, with the three FBGs 114 equally spaced from each other. The first pulse 602a shows the sensing pulse after it has reflected off of the first FBG 114a; the second pulse 602b shows the interference resulting from the reference pulse after it has reflected off the first FBG 114a and the sensing pulse after it has reflected off the second FBG 114b; the third pulse 602c shows the interference resulting from the reference pulse after it has reflected off the second FBG 114b and the sensing pulse after it has reflected off the third FBG 114c; and the fourth pulse 602d shows the reference pulse after it has reflected off the third FBG 114.

Any variation in the optical length of the fiber segment 116 between the first and second FBGs 114a,b is reflected in the phase variation of the second pulse 602b. Similarly, any variation in the optical length of the fiber segment 116 between the second FBG 114b and the third FBG 114 is reflected in the amplitude variation of the third pulse 602c. As discussed above in respect of FIGS. 1A-10, the optical length of the fiber 112 can be changed in response to dynamic strain, of which one type is strain in the fiber 112 caused by an acoustic signal.

Alternative Embodiments

In addition to the example embodiment of the interrogator 300 shown in FIG. 2, alternative embodiments are possible. Example alternative embodiments of the interrogator 300 are shown in FIGS. 3 and 4.

Figure 3:
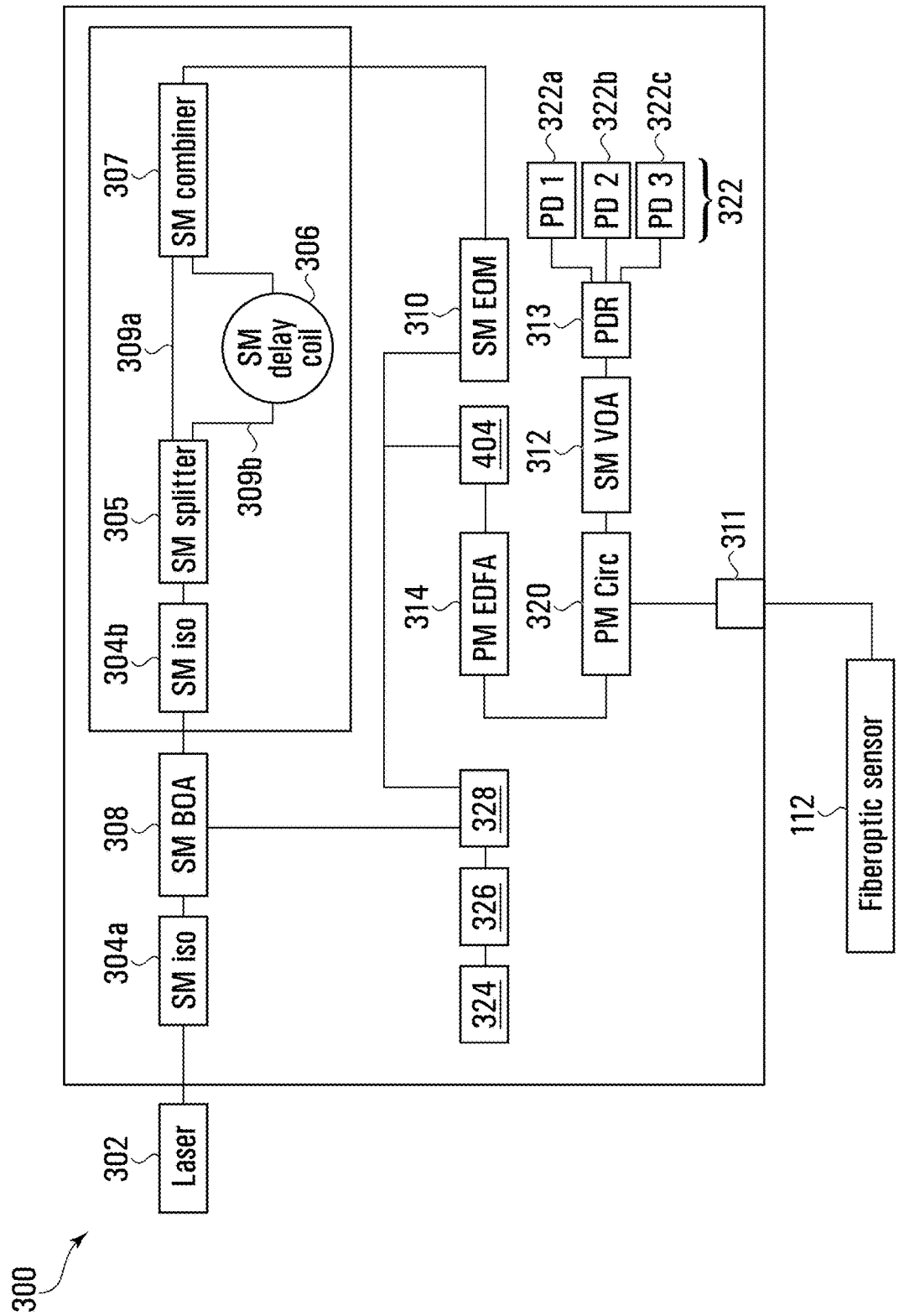
FIG. 3 is a schematic of an optical interrogator for performing interferometry using FBGs, according to one embodiment.

FIG. 3 shows an embodiment of the interrogator 300 in which a polarization controller 404 is optically coupled between the phase modulator 310 and the output optical amplifier 314. In FIG. 3, the output optical amplifier 314 and the optical circulator 320 are polarization maintaining components, and all the fiber 112 between the polarization controller 404 and the FBGs 114 (including the fiber segment 116) and between the polarization controller 404 and the polarization splitter 313 is polarization maintaining fiber ("PMF"). An example brand of PMF is Panda Fiber™ manufactured by FujikurarM Ltd. The polarization controller 404 is actively controlled by, and accordingly communicatively coupled to, the controller 324. Regardless of the polarization of the light entering the polarization controller 404, the polarization controller 404 converts the polarization of any laser light exiting the phase modulator 310 into a known polarization, which the PMF maintains. Both the sensing and reference pulses will consequently enter the output optical amplifier 314 in the same polarization state, and any changes in polarization between the output optical amplifier 314 and the receiver circuitry 322 will be experienced by both pulses except for any polarization changes occurring in the fiber segments 116 between pairs of the FBGs 114. This helps to keep the polarizations of the sensing and reference pulses aligned, which increases the degree to which the pulses interfere and consequently the sensitivity of the interrogator 300. The polarization splitter 313 allows either all reflected light or any one of three polarizations of reflected light, each separated by 120°, to pass through to the receiver circuitry 322 while discarding the remaining polarizations. Permitting only one polarization to reach the receiver circuitry 322 allows the receiver circuitry 322 to discard noisy data that could reduce the interrogator's 300 sensitivity and accuracy. The polarization splitter 313 can also be used to permit any combination of the three polarizations of the reflected light, such as the sum of any two or all three polarizations of the reflected light, to reach the receiver circuitry 322 if desired.

The polarization controller 404 in FIG. 3 increases component selection flexibility by permitting selection of a wider range of lasers than when the polarization controller 404 is not used. Commercially available lasers may or may not output light of a fixed polarization; the polarization controller 404 allows polarization of the laser 302 to be adjusted. Accordingly, the laser 302 need not emit light of a constant and known polarization in order for the interrogator 300 to emit light of a known polarization to the FBGs 114. Similarly, the polarization controller 404 allows non-PMF to be used between the laser 302 and the polarization controller 404 and allows the optical components between the laser 302 and the polarization controller 404 to not be polarization maintaining while still permitting the interrogator 300 to enjoy at least some benefits of polarization control. In an alternative embodiment (such as in FIG. 2), the polarization controller 404 can be omitted from the interrogator 300 of FIG. 3 and the laser 302 can be configured to output a known and fixed polarization and be used in conjunction with PMF and polarization maintaining optical components. In another alternative embodiment (not depicted), the polarization controller 404 may be located at a different location in the interrogator 300 than that shown in FIG. 3. For example, the laser 302 may be a communication or narrow line width laser purchased in conjunction with the PMF and with the laser polarization aligned to the PMF with the polarization controller 404 located between the laser 302 and the phase modulator 310.

In another alternative embodiment (not depicted), the interrogator 300 may omit the polarization splitter 313, such as when the optical fiber 112 outside of the interrogator 300 (including the fiber 112 comprising the FBGs 114) is PMF. In additional alternative embodiments (not depicted), the interrogator 300 may instead comprise a polarization separating component other than the polarization splitter 313. For example, the polarization splitter 313 may be replaced with any one or more of polarization filters of 0°, 45°, and 90°, and open receivers.

In another alternative embodiment (not depicted), the laser 302, input and output optical isolators 304*a,b*, and input optical amplifier 308 of FIG. 2 or FIG. 3 are replaced with an electroabsorption modulated laser (hereinafter "EML"). The EML comprises an integrated optical isolator and an absorption region that acts as amplitude modulation circuitry. The controller 324 is communicatively coupled to the EML to permit the controller 324 to control amplitude modulation. Using the EML instead of the components in FIG. 2 or 3 that it replaces results in component and cost savings and can improve extinction performance relative to using an external SOA for amplitude modulation.

In any of the embodiments described herein, some or all of the optical fiber 112 used to connect the various optical components within the interrogator 300 may be PMF and the optical components themselves may be polarization maintaining. As discussed above in respect of FIG. 3, maintaining polarization between the sensing and reference pulses using PMF can increase the interrogator's 300 sensitivity by using PMF throughout, and optionally outside, of the interrogator 300. In variants of the embodiments of FIGS. 2 and 3, for example, PMF may be used to optically couple only the components between the laser 302 and the interrogator's output 311, only between the interrogator's output 311 and the receiver circuitry 322, only between the laser 302 and the phase modulator 310, or all optical components within the interrogator 300; and regardless of whether PMF is used to optically couple the interrogator's 300 internal components together, PMF may be used for some or all of the optical fiber 112 outside of the interrogator 300 and that comprises the FBGs 114. Similarly, in the embodiment in which an EML is used, PMF may be used to optically couple only the components between the EML and the interrogator's output 311, only between the interrogator's output 311 and the receiver circuitry 322, only between the EML and the phase modulator 310, or all optical components within the interrogator 300; and regardless of whether PMF is used to optically couple the interrogator's 300 internal components together, PMF may be used for some or all of the optical fiber 112 outside of the interrogator 300 and that comprises the FBGs 114.

In another alternative embodiment (not depicted), a high-power laser can be used as a light source in order to eliminate the output optical amplifier 314. For example, a laser rated at least 100 mW may be used, and the EDFA that acts as the output optical amplifier 314 may be eliminated. This helps to reduce cost and increase SNR. A high-power laser can similarly be introduced into the embodiments of FIGS. 2 and 3.

In another alternative embodiment (not depicted), the controller 324 may implement dithering in order to reduce the effect of noise resulting from leakage crosstalk and spontaneous emissions, for example, and thereby increase SNR. As one example, in the embodiments of FIGS. 2 and 3, the input optical amplifier 308, an SOA, is used to generate a light pulse by modulating the amplitude of the laser light. However, even when the amplifier 308 is off (i.e. set to completely extinguish the laser light), some of the laser light may still be transmitted through the amplifier 308; this light is referred to as "leakage". The leakage acts as noise and impairs the interrogator's 300 SNR.

The phase modulator 310 may be used to compensate for the leakage by dithering; that is, by phase modulating the leakage at a frequency substantially higher than the interrogator's 300 interrogation frequency. For example, if the interrogator 300 is interrogating the FBGs 114 at a frequency of 4 MHz, the phase modulator 310 may modulate the leakage at a frequency of 20 MHz while the amplifier 308 is off, with the phase modulation varying the phase of the leakage between 0 radians and $\pi$ radians. When the receiver circuitry 322 receives the reflections from the FBGs 114, the average of the leakage is zero, thus improving the interrogator's 300 SNR relative to examples where dithering is not used. In one embodiment, the phase modulator 310 modulates the leakage at at least twice the interrogation frequency (i.e., the Nyquist frequency) or at some other even multiple of the interrogation frequency, which provides a net DC demodulation of the dither. Modulating the leakage at at least 2.5 times the interrogation frequency provides a potentially useful buffer between the modulation frequency and the Nyquist frequency. Modulating at higher noise dither rates, such as at at least ten times the interrogation frequency, in some embodiments permits analog filtering to be applied to the signal the interrogator 300 receives from the FBGs 114, to reduce costs. For example, in one embodiment, modulating the leakage at a rate of at least one hundred times the interrogation frequency prevents the leakage from being able to pass the bandwidth of the receiver circuitry 322, thus permitting noise filtering without having to add specialized filtering circuitry over and above what is depicted in FIGS. 2 and 3.

In some embodiments, interrogator 300 includes a GPS receiver (not depicted) for synchronizing an internal clock of controller 324 with a set of GPS satellites. The controller 324 may be configured to synchronize interrogation of the optical fibers 112 as a function of a signal received from the GPS receiver. This may be useful in cases when fiber optic data acquisition needs to be synchronized with external events, such as the exact time when a particular seismic event is generated.

Figure 5:
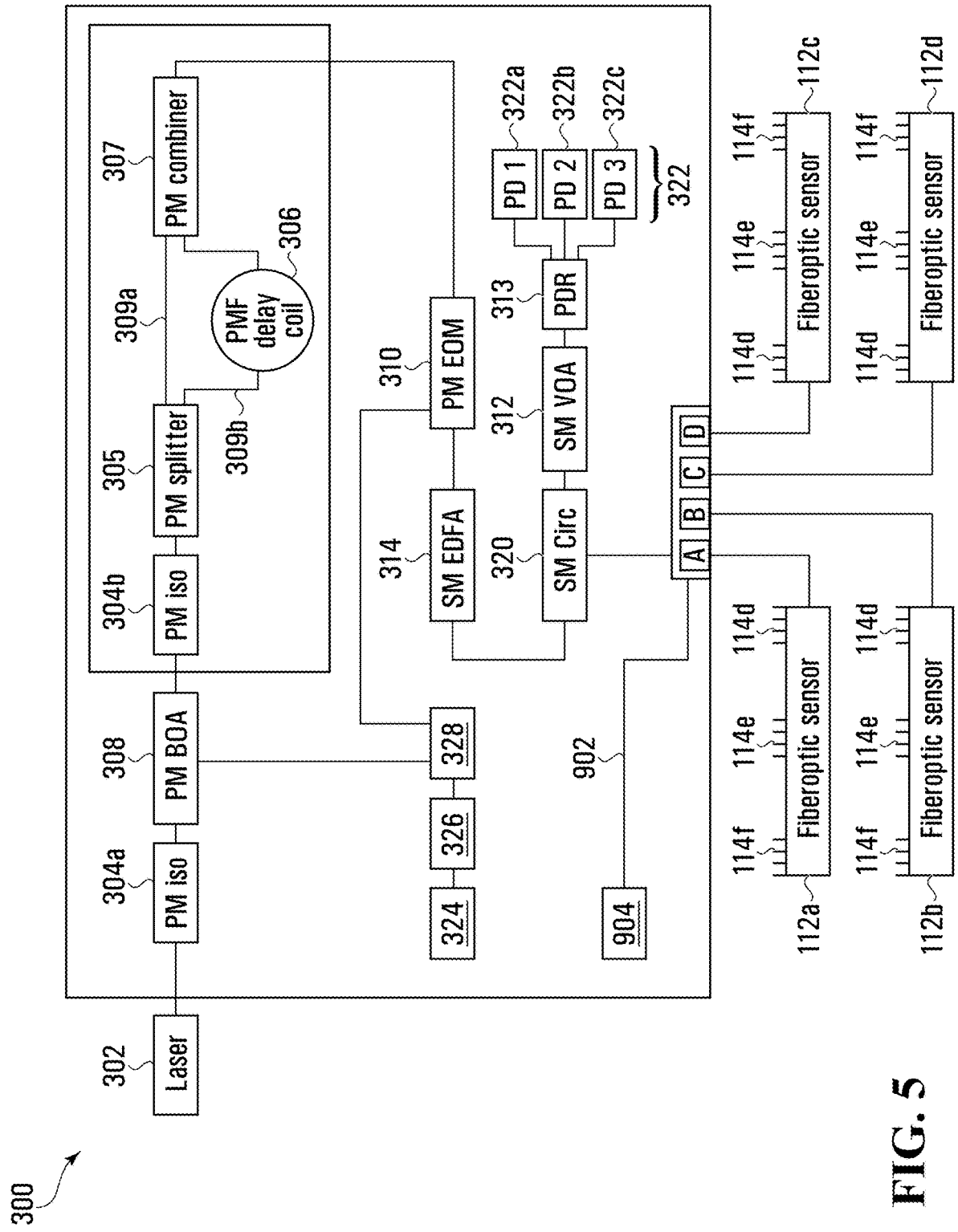
FIG. 5 is a schematic of an optical interrogator for performing interferometry using FBGs, according to one embodiment.

Referring now to FIG. 5, there is shown an embodiment of the interrogator 300 designed for multi-fiber optic data acquisition in which there are multiple fibers 112, with each of the fibers comprising different groups of the FBGs 112 that are interrogated using TDM as described above. The interrogator 300 of FIG. 5 is based on the interrogator 300 of FIG. 2 with the addition of an optical switch 902 interposed between the optical circulator 320 and the output of the interrogator 300, and the presence of switching control circuitry 904 that is communicatively coupled to and that controls operation of the optical switch 902. The switching control circuitry 904 may be, for example, an application specific integrated circuit, an FPGA, a microprocessor, a microcontroller, or any other suitable type of analog, digital, or mixed signal circuitry. The control circuitry 904 may be distinct from the controller 324 as shown in FIG. 5 or alternatively may comprise part of the controller 324 (not shown). The optical switch 902 may be, for example, an EPS0116S switch from EpiPhotonics Corp. of San Jose, California. The switching control circuitry 904 is operable to cause the optical switch 902 to select any one of switch outputs A, B, C, and D for outputting the sensing and reference pulses and for receiving reflected pulses. Switch outputs A-D are connected to first through fourth lengths of fiber 112a-d ("first through fourth optical fibers 112a-d"). On each of the optical fibers 112a-d are first through third groupings of FBGs 114d-f ("first through third FBG groups 114d-f"). The FBGs 114 comprising the first FBG group 114d are all tuned to reflect an identical, first wavelength of light; the FBGs 114 comprising the second FBG group 114e are all tuned to reflect an identical, second wavelength of light that differs from the first wavelength; and the FBGs 114 comprising the third FBG group 114f are all tuned to reflect an identical, third wavelength of light that differs from the first and second wavelengths.

The laser 302 in FIG. 5 (which may be an EML as described above, in which case isolator 304a and amplifier 308 are comprised within laser 302) is configured to output light pulses at each of the first, second, and third wavelengths, thus enabling the interrogator 300 of FIG. 5 to be used for wavelength division multiplexing ("WDM"). The receiver circuitry 322 is similarly photosensitive to the different wavelengths of light, and consequently is able to receive and output signals corresponding to the interference patterns generated by the pulses sent at those different wavelengths. In alternative embodiments (not depicted), different light sources may be used; for example, several different lasers 302 may be multiplexed together and externally modulated as opposed to using an absorption region as in the case of an EML.

Figure 6:
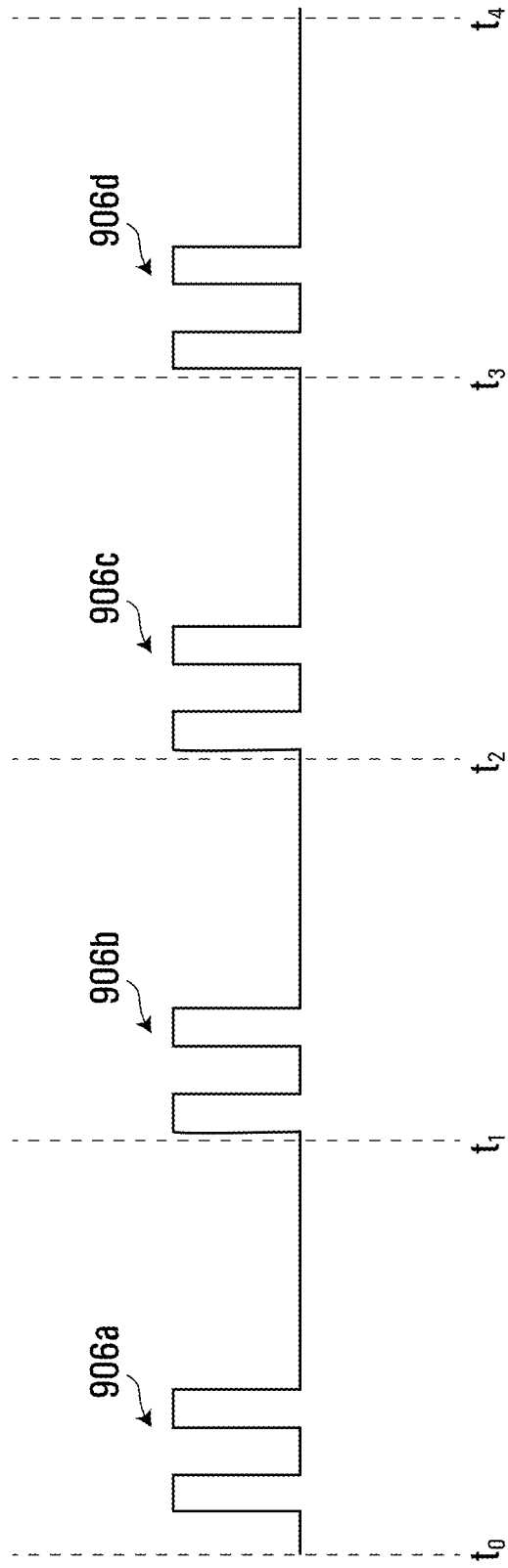
FIG. 6 depicts an example of pulse timing.

Referring now to FIG. 6, there is shown an example of pulse timing applicable to the interrogator 300 of FIG. 5. The switching control circuitry 904 instructs the optical switch 902 to transmit along the first optical fiber 112a, and the interrogator 300 then sends a first pair of pulses 906a along the first optical fiber 112a shortly after time t0. The first pair of pulses 906a is transmitted using the first through third wavelengths corresponding to the wavelengths to which the first through third FBG groups 114d-f are tuned to reflect, respectively. The first pair of pulses 906a (multiplexed using three different wavelengths of light) travels along the first optical fiber 112a, with the first pair of pulses 906a at the first wavelength reflecting off the first FBG group 114d, the first pair of pulses 906a at the second wavelength reflecting off the second FBG group 114e, and the first pair of pulses 906a at the third wavelength reflecting off the third FBG group 114f. The receiver circuitry 322 receives the three interference patterns between the end of the first pair of pulses 906a and time t1; which is shown in FIG. 6. The receiver circuitry 322 receives the interference pattern at the first wavelength as reflected by the first FBG group 114d, then at the second wavelength as reflected by the second FBG group 114e, and then at the third wavelength as reflected by the third FBG group 114f. The switching control circuitry 904 then instructs the optical switch 902 to transmit along the second optical fiber 112b, and the interrogator 300 then analogously transmits a second pair of pulses 906b along the second optical fiber 112b shortly after time t1 and receives interference patterns at the three wavelengths of light between the end of the second pair of pulses 906b and time t2. Similarly, the switching control circuitry 904 then instructs the optical switch 902 to transmit along the third and fourth optical fibers 112c,d, following which the interrogator 300 then analogously transmits a third and a fourth pair of pulses 906c,d along the third and fourth optical fibers 112c,d shortly after times t2 and t3 and receives interference patterns at the three wavelengths of light between the end of the third pair of pulses 906c and time t3 and the fourth pair of pulses 906d and time t4, respectively.

In FIG. 6, the different optical fibers 112a-d may correspond, for example, to different assets that the interrogator 300 is being used to monitor. For example, the different optical fibers 112a-d may correspond to different pipelines that the interrogator 300 is monitoring. For any one of the optical fibers 112a-d, the different FBG groups 114d-f may correspond to different portions of the asset being monitored. For example, the different FBG groups 114d-f may represent different lengths of a pipeline. Using multiple wavelengths to monitor different portions of a single asset, such as a pipeline, helps to reduce reflection losses and increase signal-to-noise ratio, since fewer of the FBGs 114 are used to reflect any one wavelength of light.

Although the interrogator 300 of FIG. 5 is based on the interrogator 300 of FIG. 2, in alternative embodiments (not depicted) the optical switch 902 and switching control circuitry 904 may be analogously added to any one or more of the embodiments of the interrogator 300 shown in FIG. 3. Alternatively, the switching control circuitry 904 and optical switch 902 may be added to other, non-depicted embodiments of the interrogator 300. Furthermore, although the optical switch 902 in FIG. 5 comprises the four outputs A-D, in alternative embodiments (not depicted) the optical switch 902 may have only two outputs, only three outputs, or more than four outputs.

In another alternative embodiment, the different optical fibers 112a-d can be connected in series by connecting the end of one of the optical fibers 112a-d with the beginning of another of the optical fibers 112a-d. The interrogator 300 may then interrogate the different optical fibers using TDM or WDM, as described above. To reduce reflection losses, an optical circulator 320 may be placed in-between each pair of the optical fibers 112a-d, with each of the optical circulators 320 redirecting reflections from the FBGs 114 directly to the receiver circuitry 322. For example, an optical circulator placed between the first and second optical fibers 112a,b may redirect reflections from the FBG groups 114d-f in the second optical fiber 112b to the signal processing device 322. Such an embodiment is described in more detail below, in connection with FIGS. 8 and 9.

In another alternative embodiment (not depicted), the interrogator 300 may comprise the switching control circuitry 904 and the optical switch 902 and be configured to transmit along multiple optical fibers, but not use a WDM-capable light course.

Figure 8A:
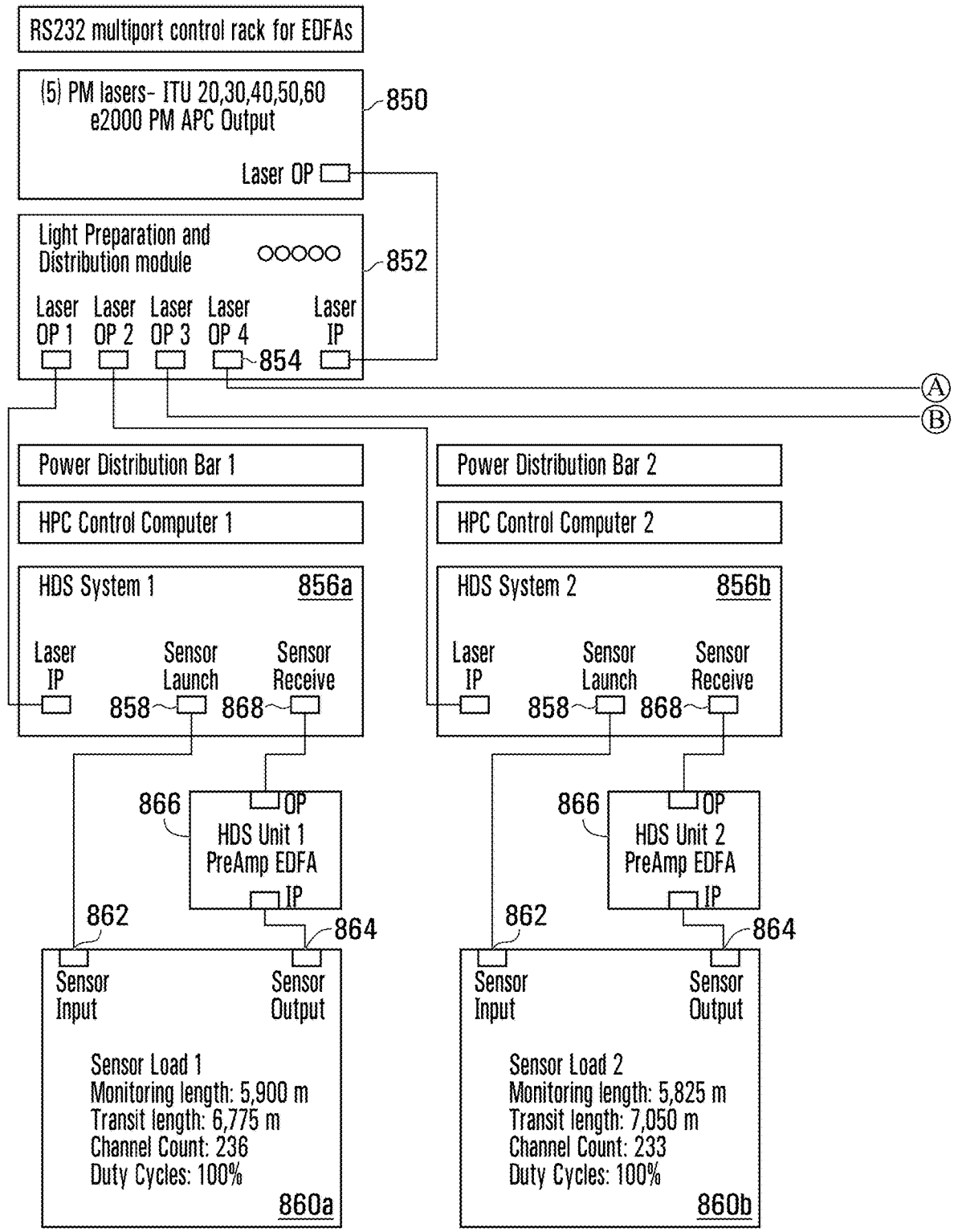
FIGS. 8A and 8B are a schematic of multiple optical interrogators for interrogating multiple sensor loads, according to one embodiment.
Figure 8B:
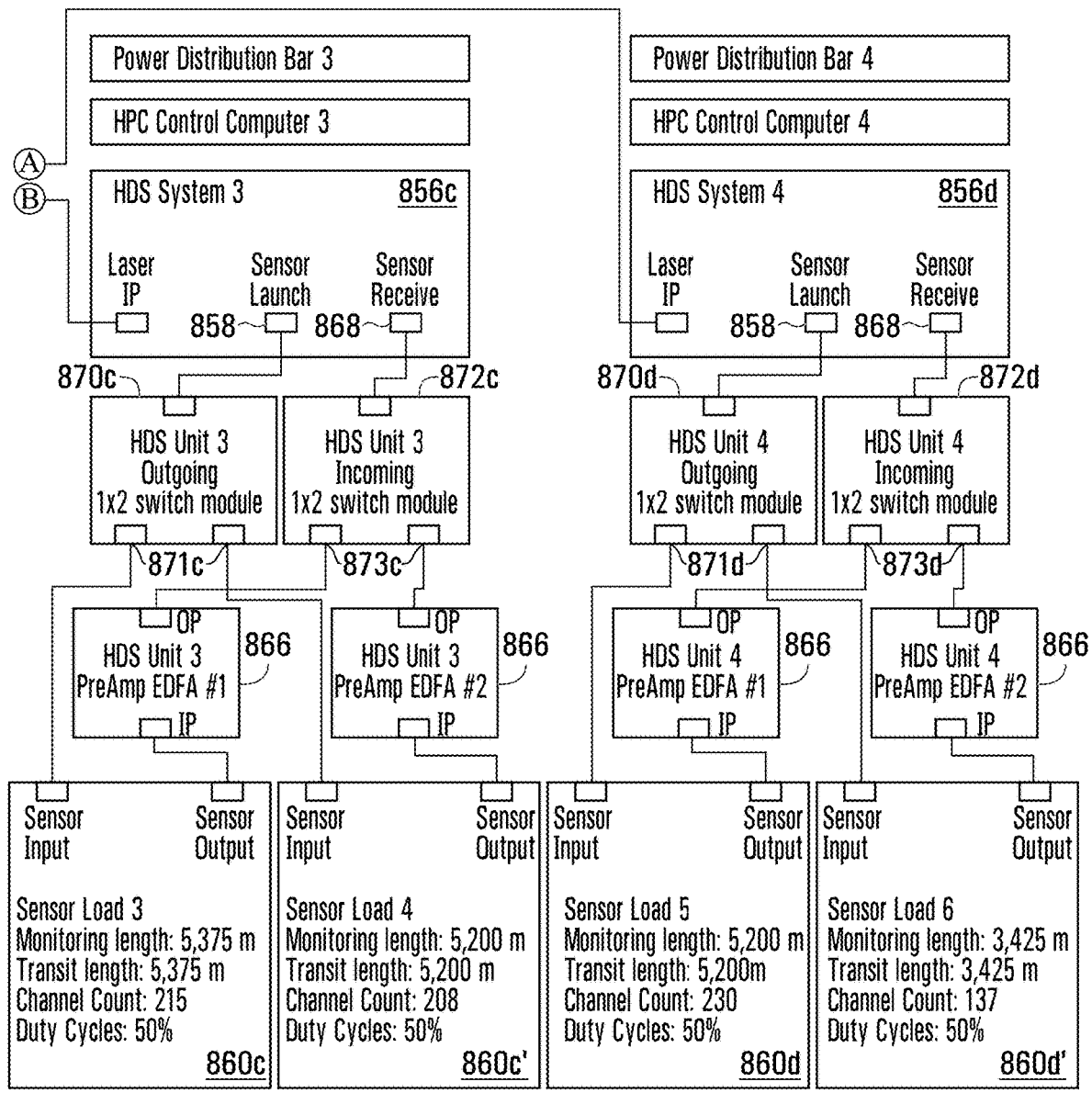

FIGS. 8 and 9 show an embodiment of an architecture that may be used to implement long-distance interferometry-based acoustic monitoring, in particular when multiple optical fibers are used. The architecture of FIGS. 8 and 9 uses multiple interrogators in order to monitor a particularly long asset. For example, for particularly long pipelines, it may be necessary to employ multiple interrogators in order to accurately monitor the dynamic strain along optical fiber deployed along the entire length of the pipeline.

Turning to FIG. 8, there is shown a light source 850, such as a laser as described above in connection with any of the above-described embodiments, optically coupled to a light distribution module 852. Light distribution module 852 splits incident light among a number of outputs 854, each optically coupled to an interrogator 856a-d (interrogators 856). Interrogators 856 are similar to any of the above-described interrogators, wherein a light pulse received at the interrogator is split into a reference pulse and a sensing pulse, delayed relative to each other, and wherein the split light pulses are subsequently transmitted out of the interrogator via an output 858.

Referring now to interrogators 856a and 856b, outputs 858 are optically coupled to sensor loads 860a and 860b via sensor load inputs 862. Each sensor load comprises a number of optical fiber segments (shown in more detail in FIG. 9), wherein each segment comprises groups of FGBs as described above. Light reflected from FBGs is returned from the sensor load via a sensor load output 864, and is directed to an optical amplifier 866. The optical amplifiers 866 are configured to increase the strength of the optical signal received from the reflections off the FBGS, since light reflected off the FBGs will have undergone a degree of attenuation. The pulses are then returned to interrogators 856a,b via interrogator inputs 868, and subsequently to receiver circuitry 322 (not shown) as described above.

Referring now to interrogators 856c and 856d, interrogators 856c and 856d comprise outgoing optical switches 870c,d and incoming optical switches 872c,d, unlike interrogators 856a and 856b. As explained in more detail below, this allows interrogators 856c and 856d to interrogate a greater total length of optical fiber, albeit at a reduced duty cycle. Outgoing optical switches 870c,d are configured to alternately allow transmission of light pulses through outputs 871c,d, whereas incoming optical switches 872c,d are configured to alternately allow transmission of light pulses through inputs 873c,d.

In each of interrogators 856c,d, controller 324 (not depicted) is communicatively coupled to outgoing optical switch 870c,d and incoming optical switch 872c,d, and controls operation of outgoing optical switch 870c,d and incoming optical switch 872c,d such that, when light is transmitted out of a first output 871c,d of outgoing optical switch 870c,d, the light is sent to a first sensor load 860c,d and is returned to interrogator 856c,d via a first input 873c,d of incoming optical switch 872c,d. Similarly, each controller 324 controls the operation of outgoing optical switch 870c,d and incoming optical switch 872c,d such that, when light is transmitted out of a second output 871c,d of outgoing optical switch 870c,d, the light is sent to a second sensor load 860c',d' and is returned to interrogator 856c,d via a second input 873c,d of incoming optical switch 872c,d. Thus, whereas sensor loads 860a,b are monitored at 100% duty cycle by interrogators 856a,b, sensor loads 860c,c',d,d' are monitored at duty cycles of less than 100%, such as 50% each. However, interrogators 856c,d are configured to monitor roughly twice the length of optical fiber as are interrogators 856a,b (albeit at the cost of a reduction in the frequency of the monitoring). Other combinations of duty cycles are possible, such as 60%/40%, 70%/30%, etc.

Turning to FIG. 9, there is shown in more detail the optical fiber segments that constitute sensor loads 860a-d'. For the sake of clarity, only the optical fiber segments of sensor load 860a have been annotated in FIG. 9, though analogous annotations apply to the remaining components seen in FIG. 9.

An optical splitter 874 is positioned between the interrogator output 858 and sensor load input 862, and is configured to split light incident on an input 876 of splitter 874 and send the split light out multiple outputs 878 of splitter 874. Each output 878 of splitter 874 is optically coupled to a respective lead-in optical fiber 880, which does not comprise any FBGs. Each lead-in optical fiber 880 is in turn optically coupled to a first port of a respective optical circulator 882 (circulators 882 operate in a similar fashion to circulator 320 described above). Physically, the location of circulators 882 correspond to sensor load inputs 862 seen in FIG. 8. The second port of each circulator 882 is optically coupled to an optical fiber segment 884. Each optical fiber segment 884 comprises one or more groups of FBGs (not shown), as described above. Each third port of optical circulators 882 is optically coupled to a respective return optical fiber 886 (which does not comprise FBGs) leading to a filter and balance unit (FBU) 888. Light output from FBUs 888 is directed into an optical combiner 890 which directs light incident on its multiple outputs 892 out via a single output 894. The light output from combiner 894 is directed to interrogator input 868, and subsequently to receiver circuitry 322 as described above.

Thus, the reference and sensing pulses emitted from interrogators 856 are directed to optical splitters 874, whereupon the pulses are split into a number of pairs of reference and sensing pulses, each pair of pulses being directed along a lead-in optical fiber 880 towards a circulator 882. Upon arriving at circulator 882, each pair of pulses is directed along an optical fiber segment 884. Reflections of each pulse pair off FBGs located on the optical fiber segments 884 are returned to circulators 882 and redirected along return optical fibers 886 towards FBUs 888. Once output from FBUs 888, each pulse pair enters combiner 890 and exits combiner 890 via output 894. The pulse pairs are then returned to interrogators 856 and directed to receiver circuitry 322 for processing, as described above.

FBUs 888 serve a two-fold purpose. They serve to filter out ASE (amplified spontaneous emission) which may have been generated by some of the optical components inside or outside the interrogator 856. Furthermore, they serve to balance the optical power received at the interrogator 856. Different pulse pairs will have undergone different attenuations as they are reflected from different groups of FBGs in different optical fiber segments 884. Thus, FBUs 888 may equalize the intensity of each returning pulse in order to make maximal use of the receiver's dynamic range.

Note that in the embodiments of FIGS. 8 and 9, circulators 882 effectively replace the circulator 320 seen in the embodiments of FIGS. 2, 3 and 5.

Different pulse pairs may be distinguished by using WDM as described above, in which case FBGs along a given optical fiber segment 884 are tuned to a different center wavelength than FBGs disposed along another optical fiber segment 884. Furthermore, TDM may be used to de-reference the pulse pairs emitted from the interrogators 856, by distinguishing the pulse pairs based on their time of flight. For example, TDM may be used while also using FBGs tuned to different center wavelengths. Thus, multiple light sources and FBGs of different wavelengths may be used to cover larger distances, while still using TDM to de-reference the return pulses based on their time of flight.

Vibration and Thermal Compensation

In some embodiments, interrogator 300 comprises a 3D accelerometer (not shown). The accelerometer may be positioned adjacent controller 324, for example on a PCB on which is located controller 324. Vibrations experienced by interrogator 300 may couple to various components of interrogator 300, such as delay coil 306 and/or laser 302, and appear as common mode signals on the phase data obtained during interrogation of optical fiber 112. Controller 324 may therefore carry out a method for compensating for vibrations experienced by interrogator 300.

In one embodiment, the method comprises determining a correlation between acceleration data obtained from the accelerometer, and the phase data obtained from interrogation of the optical fiber 112. The acceleration data and the phase data may be obtained during a diagnostic or training phase; in other words at a time during which interrogator 300 is not being actively used to optical fiber 112. There are various ways known to one of skill in the art regarding how a correlation between two variables may be determined. For example, controller 324 may determine the cross-correlation between the acceleration data and phase data. Alternatively or in addition, controller 324 may apply one or more adaptive filters to the acceleration data and phase data. During a monitoring phase, i.e. at a time when interrogator 30 is being used to interrogate optical fiber 112, controller 324 adjusts the phase data obtained as a function of the correlation, in order to compensate for the vibrations experienced by interrogator 300. Thus, the effects of vibrations of the interrogator 300 may be largely eliminated. A typical accelerometer may have three-dimensional sensitivity and a sensing range of +/−2 g.

In addition, or alternatively, interrogator 300 may comprise a temperature sensor (not depicted) for measuring a temperature inside the interrogator 300, for example in close proximity to compensator delay coil 306. Changes in temperature of delay coil 306 directly affect the optical path length of the delay coil 306. Thus, in an analogous fashion to the method described above for compensation for vibrations of the interrogator 300, the effects of temperature on the delay coil 306 may be compensated by determining the correlation between phase data and temperature data obtained from the temperature sensor.

It is envisaged that the effect of other parameters on the phase data may also be accounted for, by using appropriate sensors in order measure the effect such parameters. By determining the correlation between measurements taken from such sensors, and the phase data obtained during such measurements, phase data obtained during an interrogation of the optical fiber 112 may be adjusted as a function of the correlation.

Firmware Data Flow

Figure 12A:
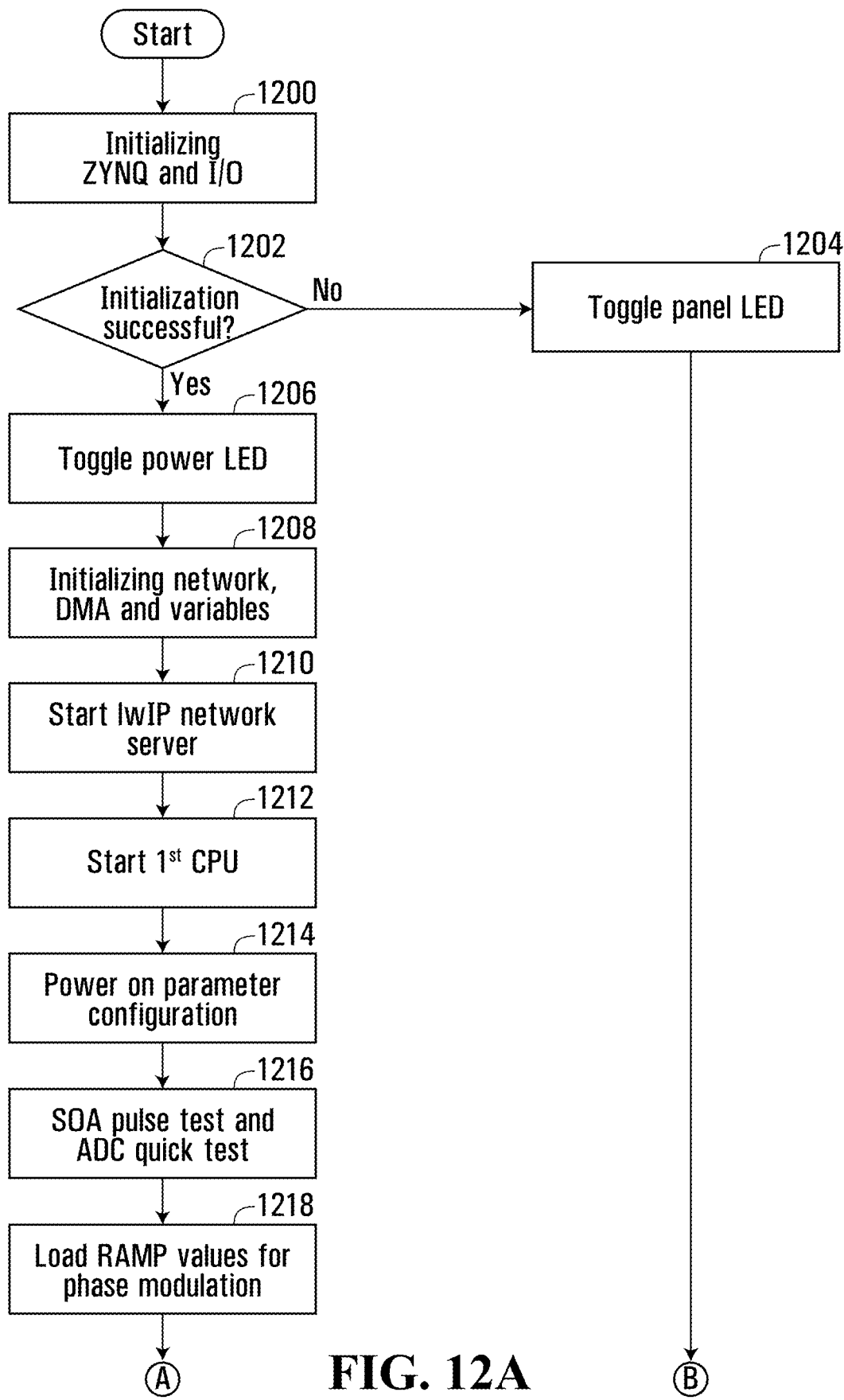
FIGS. 12A and 12B show a data flow process for the interrogator, according to one embodiment.
Figure 12B:
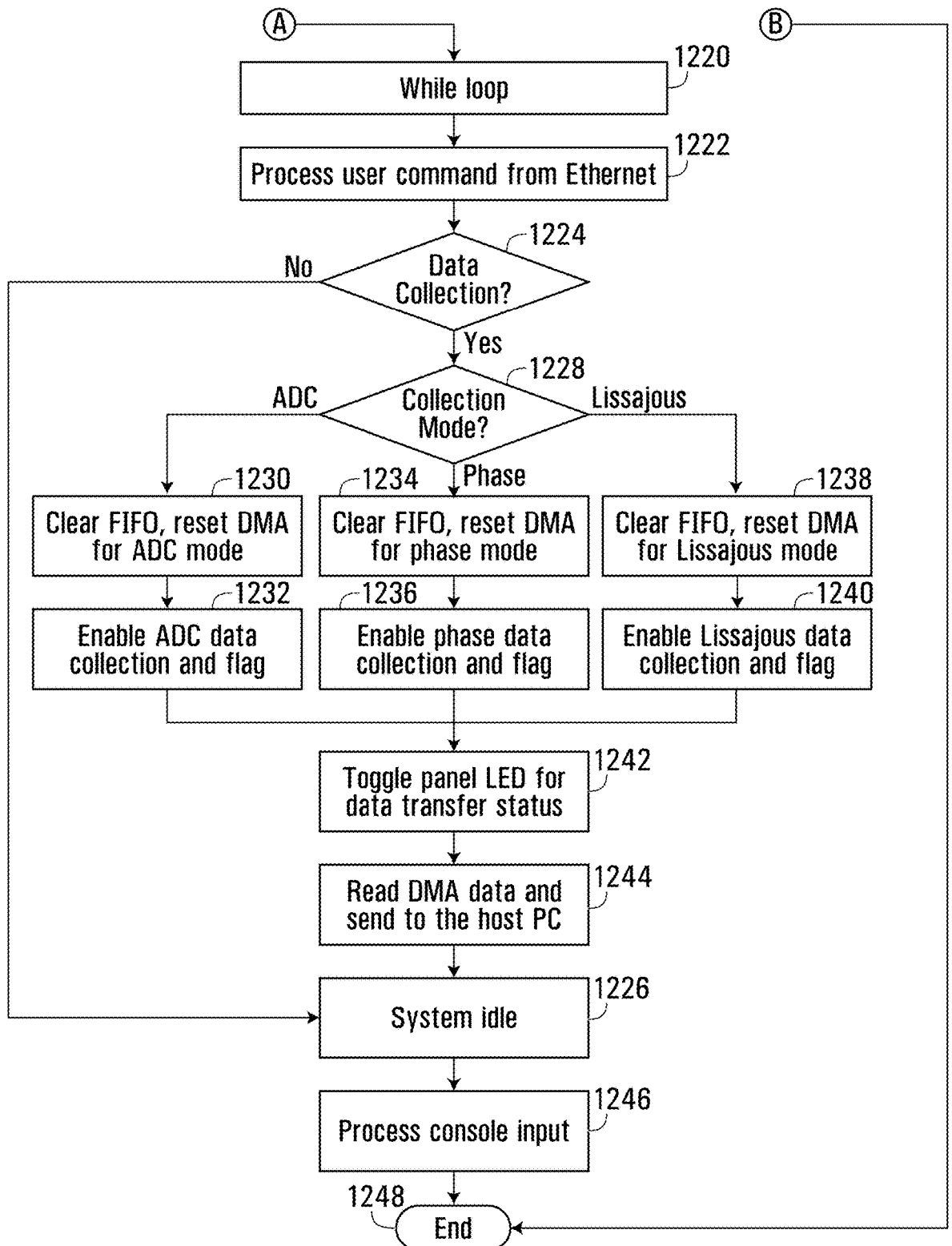

FIGS. 12A and 12B show a data flow of the control circuitry of the interrogator, according to one embodiment. This data flow may be carried out by control circuitry of any of the above-described interrogator embodiments. Control circuitry includes controller 324 and one or more processors (not depicted), such as a CPU, that are communicative with controller 324.

The process begins by entering a number of component initialization steps before data collection commences. At step 1200, the control circuitry is initiated. At step 1202, the interrogator determines whether the initialization of the control circuitry was successful. If not, then at step 1204 one or more LEDs are toggled to indicate the initialization failure to the user. If the initialization is successful, then at step 1206 one or more LEDs are toggled to indicate the initialization success to the user. At step 1208, the interrogator initiates the network communicatively coupling the interrogator to the signal processing device 118, and initiates DMA. At step 1210, the interrogator starts a lightweight IP network. The lightweight IP network provides the lightweight implementation of the TCP/IP networking stack. At step 1212, if two CPUs are being used, then a CPU of the control circuitry is initiated. Step 1212 may be omitted if only one CPU is being used. At step 1214, parameter configuration is powered on. At step 1216, input amplifier 308 is tested. At step 1218, RAMP values for the phase modulator 310 are loaded. The RAMP values define the step sizes which the phase modulator 310 will use to modulate the phases of the sensing and reference pulses.

Turning to FIG. 12B, at step 1220, the process enters a while loop in which at step 1222 a user command received over the network is processed. At step 1224, the interrogator determines whether the user command is for a data collection mode. If not, then the process moves to step 1226 where the interrogator enters an idle state. If so, then at step 1228 the control circuitry determines which collection mode has been requested by the user. If the user has requested ADC data, then at step 1230 the FIFO is cleared (see below), and DMA is reset. At step 1232, ADC data collection is enabled. ADC mode is an alternative to phase mode, and can be selected by the user from the user interface of the signal processing device 118. ADC mode is a mode in which the interrogator transmits the ADC output counts to the signal processing device 118, instead of extracted phase data. This can be useful in the initial setup and tuning of the system, for example by allowing the user to specify the sample positions of the received pulses, or to see if any erroneous reflections are present in the system.

Figure 12C:
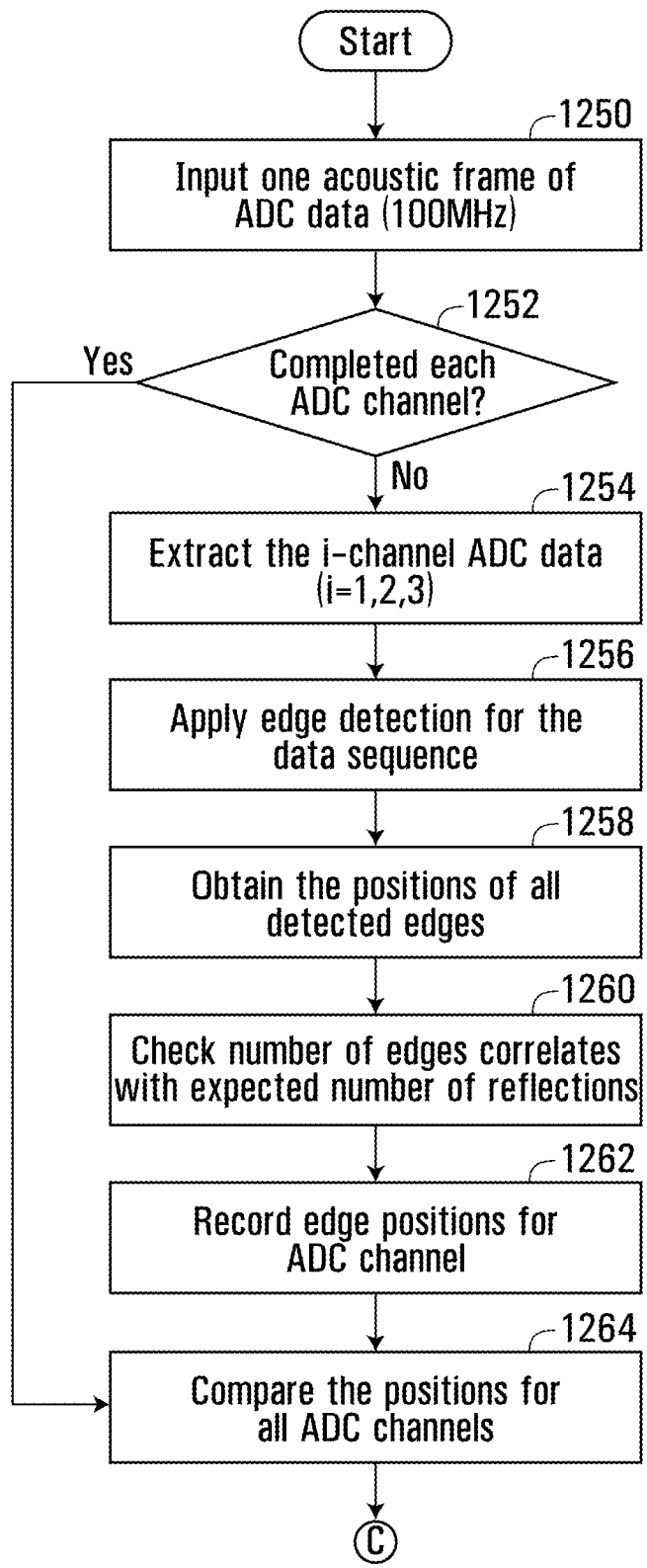
FIGS. 12C and 12D show a method of determine edge positions, according to one embodiment.
Figure 12D:
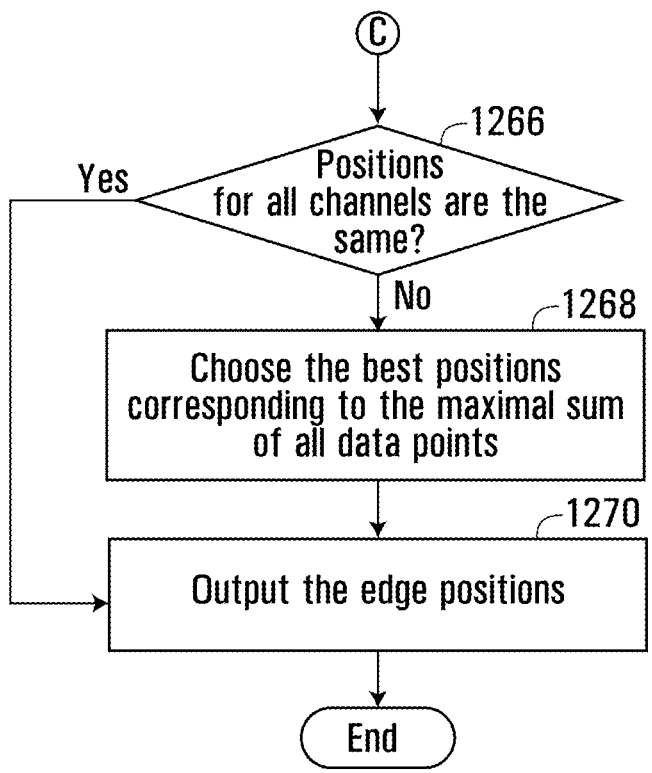

The number of optical signals reflected off the FBGs, and the arrival timing of these reflections, depend on the particular sensor array being deployed. The interrogator has no prior knowledge of this and therefore the expected number of received pulses and their timing sequence must be specified before phase data acquisition can begin. The interrogator is typically entered into ADC mode (steps 1230 and steps 1232) during an initial setup or calibration phase. In this mode, the interrogator may determine the particular points in time at which to sample the optical signals returned to the interrogator, using analogue to digital converters (ADCs) comprised in receiver circuitry 322. Turning to FIGS. 12C and 12D, there is shown one such method of automatically searching for sampling positions, in ADC mode.

At step 1250, one acoustic frame of data is sampled by the ADCs. In the present embodiment, three ADCs are used (one for each component of light split from polarization splitter 313), although in other embodiments more or fewer ADCs may be used. In the present embodiment, the ADC sampling rate is 100 MHz, although other rates may be used. At step 1252, a check is carried out to determine whether data from all three ADCs have been analyzed. If yes, then the process moves to step 1264. If not, then the process moves to step 1254 where the data sampled from one of the ADC channels is extracted. At step 1256, an edge detection algorithm (of which various ones are known in the art) is applied to the extracted ADC data. At step 1258, the positions of the detected edges are obtained. The edges correspond to the points in time when a reflected pulse (whether interfering with another pulse or not) is seen at receiver circuitry 322 to be rising or falling. For example, with reference to FIG. 4, there can be seen eight edges 606 corresponding to four reflections that would be detected by the edge detection algorithm.

At step 1260, a check is carried out to determine whether the number of detected edges corresponds to the number of expected reflections. Generally, if there are n FBGs in the senor array, there are n+1 reflected pulses, leading to 2(n+1) edges, half of which are rising edges of the reflected pulses and the other half corresponding to the falling edges of those pulses. At step 1262, the position of each edge for the particular ADC channel is recorded. At steps 1264 and 1266, the positions of the edges detected in each of the ADC channels are compared. If they are the same, then the edge positions are output to controller 324 (step 1270) which stores them in memory (see below). If the positions do not match, then those edge positions with the greatest corresponding optical power are selected for storage in memory (step 1268). As will be described below in more detail, the stored edge positions are used when interrogator is interrogating optical fiber, so that the interrogator is able to sample the reflected pulses at the right point in time, for extracting meaningful phase data.

Note that in ADC mode, the phase modulator 310 is typically deactivated so that the return pulses received at receiver circuitry 322 are substantially flat-topped, and therefore are more easily analyzed for their edges.

Furthermore, the above-described method is merely exemplary in nature, and in other embodiments one or more steps may be omitted and/or reordered.

Returning to FIG. 12B, if the user has requested phase data, then at step 1234 the FIFO is cleared, and DMA is reset. At step 1236 phase data collection is enabled, e.g. by interrogating the optical fiber, as described above. If the user has requested Lissajous data, then at step 1238 the FIFO is cleared, and DMA is reset. At step 1240 Lissajous data collection is enabled (see below). A user may request both phase data and Lissajous data at the same time.

The process then moves to step 1242 where one or more LEDs are toggled to indicate the data transfer status. At step 1244, DMA data is read and transferred to the signal processing apparatus 118 as described below in connection with FIG. 11. The process moves to step 1246 where any further user inputs are processed in which case the process repeats the while loop by returning to step 1220. At step 1248 the process ends.

The above-described method is merely exemplary in nature, and in other embodiments one or more steps may be omitted and/or reordered.

In embodiments, controller 324 is configured to digitize the electrical signals output by receiver circuitry 322 into data packets, using ADCs as described above and then by mathematically extracting the phase data from the digitized interference patterns. As can be seen in FIG. 10, each data packet 1000 includes a preamble 1002 and a payload 1004. The preamble 1002 comprises a key 1006 and a frame number 1008, and the payload 1004 comprises 2 bits of ADC out-of-range (OR) indicators 1010, 2 bits of PDR channel selection information 1012, 8 bits indicating the particular channel number 1014 (i.e. the particular group of FBGs from which the pulses were reflected), and 20 bits of phase data 1016 (comprising information relating to the interference between the reference and sensing pulses). ADC OR indicators 1010 indicate when the ADCs, comprised in receiver circuitry 322 are receiving input values which exceed their full-scale input range. The 2 bits of PDR channel selection information 1012 inform the user about the particular PDR mask which was used to extract the phase data. The PDR masks are used to observe the different polarized components of the light emitted from polarization splitter 313. The 2 bits can contain one of 4 possible values (0, 1, 2, 3). This information can be logged for debug purposes by the signal processing device 118. For example, if the operator notices that at a particular point in time the phase data exhibits unexpected characteristics, he or she may check the debug file to see which PDR mask was being used at that given point in time. The frame numbers of consecutively assembled data packets are incremented by one. In other embodiments, the data packets may take other forms.

Figure 11:
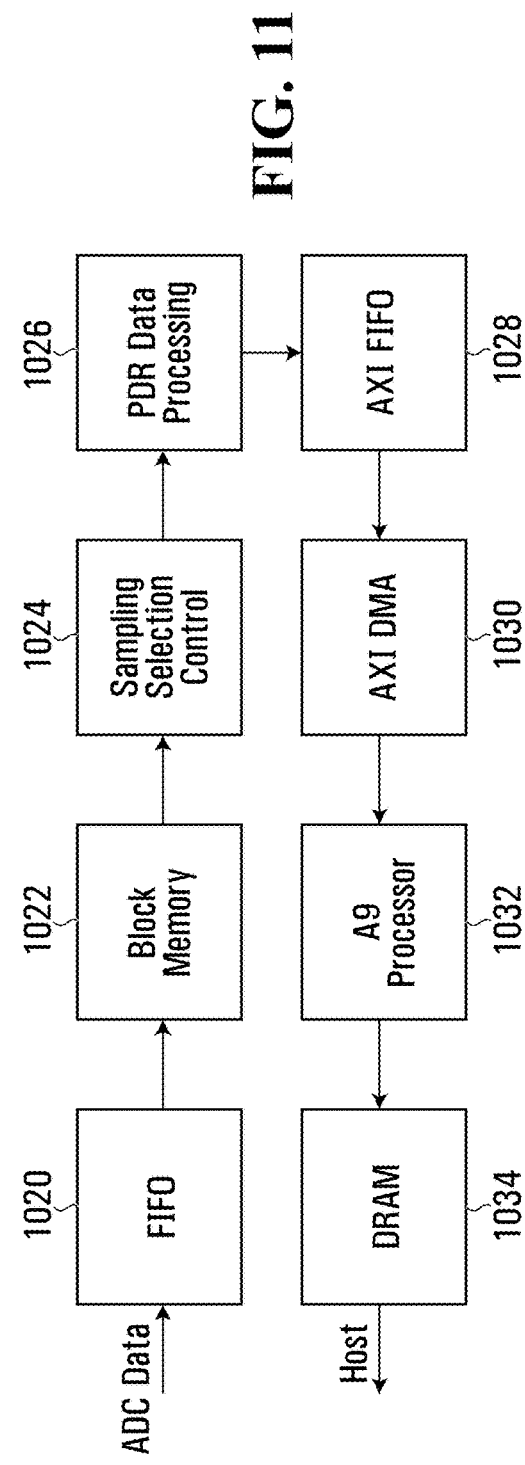
FIG. 11 is a method of packaging and transferring phase data from the interrogator to a signal processing device, according to one embodiment.

The process of assembling the data packets 1000 and transferring the data packets to signal processing device 118 is shown in FIG. 11. At step 1020, the digitized data is transferred to a FIFO (first in, first out) queue. At step 1022, the data contained in the FIFO is transferred to a block memory (which may also be referred to as block RAM) located inside controller 324. At step 1024, the data undergoes sampling selection control. The data in the block memory is originally sampled from the ADCs. This continuously acquired block of data comprises the records of the optical signal from the optical fiber. However, only those data segments related to the two optical pulses across the selected optical fiber segments will be useful and will be extracted. Thus, only those ADC samples which correspond to pulses returning from FBGs are required. A sampling selection control module therefore selects the appropriate data points based on pre-specified sampling positions and outputs five data points for demodulation purposes per channel to the next module for further processing. In other embodiments, more or fewer data points may be used for phase extraction. The sample positions are pre-specified using the stored edge positions determined using, for example, the method of FIGS. 12C and 12D.

At step 1026, the data undergoes PDR data processing. The PDR data processing completes the following tasks: measurement processing, PDR mask selection logic, phase correction and data packaging. The measurement processing comprises a demodulation process and outputs the phase through computations based on the obtained five data points and the mask switching scheme. The PDR mask selection logic comprises different modes such as fixed mode, one-time mode, and normal mode. The fixed mode is specified through configuration and, in this mode, the same mask (specified by the user) will be used at all times. The one-time mode chooses the maximum intensity mask at the beginning and will lock onto that mask, without switching to other masks. The normal mode will start with the maximum intensity mask and switch to another mask whose received power exceeds the current mask's power by a certain threshold level (pre-specified by the user). After the phase is calculated, it is further compensated through the phase correction procedure. The corrected phase, together with other information such as ADC status, mask and channel, are packaged into a 32-bit data packet as described above in connection with FIG. 10. This data sequence is further appended with a key 1006 and frame number 1008.

The data packet is then transferred to AXI FIFO (step 1028). AXI FIFO provides buffering based on FIFO and follows the AXI4 interface protocol. Subsequently, the data packet is transferred to AXI DMA (step 1030). AXI DMA provides direct memory access between the memory (DRAM) and the AXI FIFO. At step 1032, the data packet is transferred to an A9 processor, and subsequently to DRAM (step 1034). Lastly, the data packet is transferred from interrogator 300 to signal processing device 118, using a communication method with a relatively large data throughput, such as a gigabit Ethernet cable, capable of a throughput of at least 1 Gb/s.

The above-described method is merely exemplary in nature, and in other embodiments one or more steps may be omitted and/or reordered.

Error Checking

In embodiments, once a data packet 1000 is received at signal processing device 118, signal processing device 118 is configured to carry out a method for checking an integrity of the data packet 1000. In particular, signal processing device 118 determines whether the data packet 1000 meets a data error condition. In one embodiment, determining whether the data packet 1000 meets the data error condition comprises determining if the difference between any two consecutive keys' locations is equal. In another embodiment, determining whether the data packet 1000 meets the data error condition comprises determining if the frame numbers of any two consecutive data packets 1000 meet a predetermined requirement. In one embodiment, the predetermined requirement comprises the second frame number (e.g. the frame number of the later-received data packet) having a value which is one greater than the first frame number (e.g. the frame number of the earlier-received data packet). In another embodiment, the predetermined requirement comprises the keys of any two consecutive data packets to be separated by a preset number of bits. If no data error condition is met, then signal processing device 118 determines that the data packet is error-free and extracts the phase data 1016 from the payload 1004. The phase data 1016 may be converted to another format such as Matlab® for further processing.

If signal processing device 118 determines that the data error condition has been met, then signal processing device 118 marks the data packet 1000 as an erroneous data packet, in order to avoid further errors in the subsequent error checking. For example, when error checking the next data packet, the signal processing device 118 will ignore any previous data packets that have been found to fail the error check.

Lissajous Data

When processing the interference pattern of linearly modulated pulses, the magnitudes of the five ADC sample points on the received interference pattern can be input into a mathematical formula to extract quadrature measures whose magnitudes are related to the received optical power, as well as the sine and cosine of the phase angle embedded in the interference pattern. The phase angle is then the arctangent of the quadrature measures.

Lissajous data comprises the sine and cosine pairs for each sample, and may be transmitted by interrogator 300 to signal processing device 118. The Lissajous data contains these sine and cosine values. Signal processing device 118 can use these sine and cosine values to calculate the quality of the received optical data. Mathematically, if the sine and cosine values are plotted for a number of of received Lissajous samples, the results should fall on the outline of a perfect circle. However, in practice other shapes can be obtained, such as ellipses, indicating that the sine and cosine calculations are not perfect. This may indicate that the optical quality of the data is in question and that the calculations are not fully reliable.

Controller 324 is configured to interleave the Lissajous data (for all 3 PDR masks) with the phase data and send it to signal processing device 118 in real time. The Lissajous data may be helpful in extracting an optical figure of merit from the data. A typical figure of merit is of the form (mean(R))/(standard deviation (R)), where R is the sum of the squares of the sine and cosine terms used to calculate the phase angle.

Calibration

Figure 13:
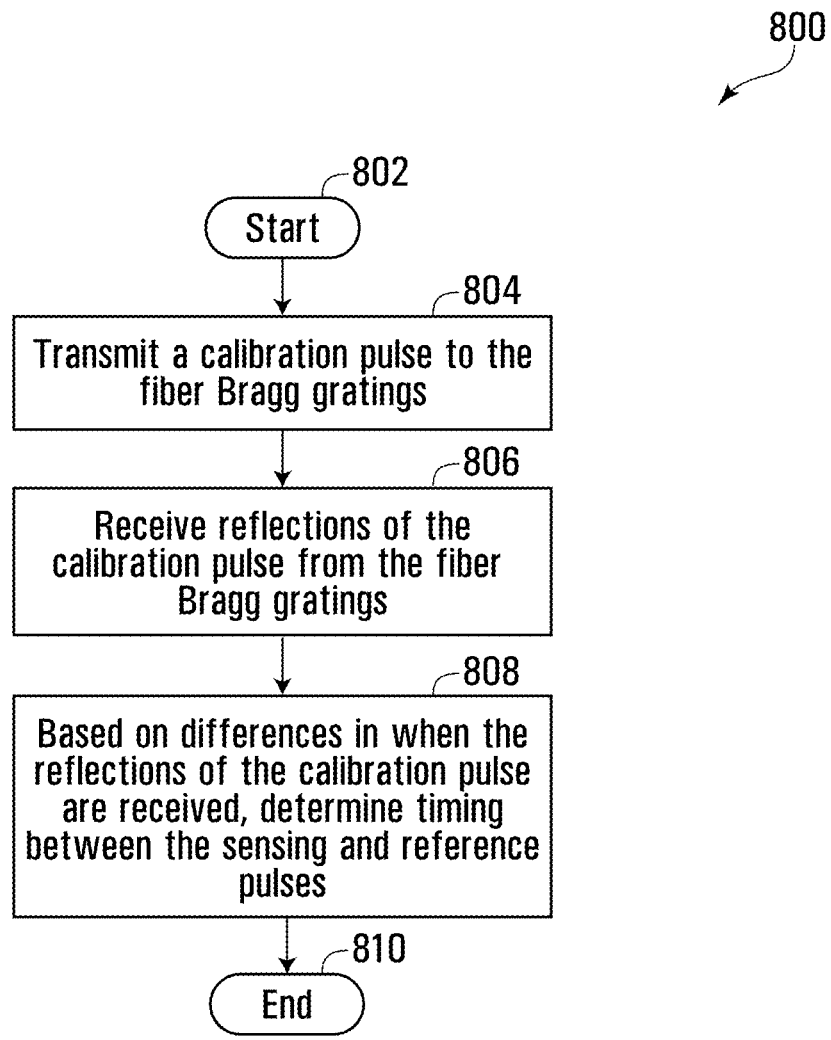
FIG. 13 shows a method of calibrating the interrogator, according to one embodiment.

Referring now to FIG. 13, there is shown a method 800 for calibrating the interrogator 300, according to another embodiment. The method 800 may be encoded onto the FPGA that comprises the controller 324 as a combination of FPGA elements such as logic blocks. The method 800 is described below in conjunction with the interrogator 300 of FIG. 2, although it may also be performed using other embodiments of the interrogator 300, such as the embodiment of FIG. 3.

When performing the method 800, the controller 324 begins at block 802 and proceeds to block 804 where it transmits a calibration pulse to the FBGs 114. This calibration pulse may or may not be phase adjusted using the phase modulator 310. The calibration pulse is reflected off each of the FBGs 114 and the reflected pulses return to the interrogator 300 and are received by the receiver circuitry 322 (block 806). The pulse that reflects off the first FBG 114a returns to the receiver circuitry 322 first and has the highest amplitude of the reflected pulses; the pulse that reflects off the second FBG 114b is the second reflected pulse to arrive at the receiver circuitry 322 and has the second highest amplitude, and this pattern continues for the reflections off the remaining FBGs 114. The controller 324 at block 808 determines the timing between the sensing and reference pulses based on differences in when the reflections of the calibration pulse are received at the receiver circuitry 322. Determining the arrival times of the calibration pulses may also be helpful in understanding the spatial separation of the FBGs in the sensor array, especially if the locations of some FBGs have changed for some reason.

The timing between the sensing and reference pulses can be controlled by the delay induced by the delay coil 306 or other optical delayers. In some embodiments (not shown), there may be multiple optical delay coils and an associated optical switch for switching transmission of light between the delay coils. Each delay coil may be configured to induce a different delay to light entering the delay coil. Calibration of the interrogator may comprise selecting a particular delay coil, using the optical switch, based on differences in when the reflections of the calibration pulse are received at the receiver circuitry 322. In another embodiment (not shown), a delay-on-chip circuit may act as the optical delayer and may be configured to induce a user-selectable, variable delay. In such a case, calibrating the interrogator may comprise configuring the delay-on-chip circuit to induce a particular delay, based on differences in when the reflections of the calibration pulse are received at the receiver circuitry 322.

In one embodiment, second order reflections from the FBGs 114 (i.e., reflections of reflections) are mitigated using digital signal processing techniques such as infinite impulse response or finite impulse response filters, or through suitable modulation such as with Barker codes.

A calibration pulse can also be used to level power between multiple lasers when wavelength division multiplexing is being used, and to adjust gain of the various amplifiers 308,314 in the interrogator 300.

Calibration using a calibration pulse can be done at initial setup of the interrogator 300 or periodically while using the interrogator 300 to interrogate the optical fiber 112. The interrogator 300 can be recalibrated as desired; for example, depending on factors such as thermal changes, mechanical changes (e.g. geotechnical shifts), and long term fiber stretching.

As discussed above, while the phase modulator 310 in the above embodiments is a lithium niobate phase modulator, in alternative embodiments (not depicted) different types of phase modulators may be used. Example alternative phase modulators are gallium arsenide phase modulators and indium phosphide phase modulators. The phase modulator 310 may or may not be a Mach Zehnder-type modulator.

Aside from an FPGA, the controller 324 used in the foregoing embodiments may be, for example, a processor, a microprocessor, microcontroller, programmable logic controller, or an application-specific integrated circuit. For example, in one alternative embodiment, the controller 324 collectively comprises a processor communicatively coupled to a non-transitory computer readable medium that has encoded on it program code to cause the processor to perform the example methods described herein. Examples of computer readable media are non-transitory and include disc-based media such as CD-ROMs and DVDs, magnetic media such as hard drives and other forms of magnetic disk storage, semiconductor-based media such as flash media, random access memory, and read only memory.

It is contemplated that any part of any aspect or embodiment discussed in this specification can be implemented or combined with any part of any other aspect or embodiment discussed in this specification.

For the sake of convenience, the example embodiments above are described as various interconnected functional blocks. This is not necessary, however, and there may be cases where these functional blocks are equivalently aggregated into a single logic device, program or operation with unclear boundaries. In any event, the functional blocks can be implemented by themselves, or in combination with other pieces of hardware or software.

While particular embodiments have been described in the foregoing, it is to be understood that other embodiments are possible and are intended to be included herein. It will be clear to any person skilled in the art that modifications of and adjustments to the foregoing embodiments, not shown, are possible.

The invention claimed is:

1. An optical fiber interrogator for interrogating multiple optical fibers comprising fiber Bragg gratings ("FBGs"), the interrogator comprising:
   a light source operable to emit phase coherent light;
   amplitude modulation circuitry optically coupled to the light source and operable to generate one or more light pulses from the light;
   an optical splitter optically coupled to the amplitude modulation circuitry and being configured to split a light pulse received from the amplitude modulation circuitry into a pair of light pulses;
   an optical delayer optically coupled to the optical splitter and configured to introduce a delay to one light pulse of the pair of light pulses relative to the other light pulse of the pair of light pulses;
   an outgoing optical switch optically coupled to the light source and comprising at least two switch outputs, the outgoing optical switch being operable to switch transmission of light between each of the at least two switch outputs;
   control circuitry comprising a controller, communicatively coupled to the amplitude modulation circuitry and to the outgoing optical switch, and configured to perform a method for interrogating the optical fiber comprising:
      generating a light pulse by using the amplitude modulation circuitry to modulate light emitted by the light source, wherein the generated light pulse is split into a pair of light pulses by the optical splitter, and wherein one of the light pulses is delayed relative to the other light pulse by the optical delayer; and
      controlling the outgoing optical switch to switch transmission between the at least two switch outputs such that the multiple optical fibers are interrogated at controllable duty cycles.

2. The interrogator of claim 1, further comprising an incoming optical switch optically coupled to receiver circuitry and comprising at least two switch inputs, the incoming optical switch being operable to switch transmission of light between each of the at least two switch inputs, wherein the control circuitry is further communicatively coupled to the incoming optical switch, and wherein the method further comprises:
   controlling the incoming optical switch to switch transmission between the at least two switch inputs.

3. The interrogator of claim 1, further comprising a phase modulator optically coupled to the amplitude modulation circuitry and operable to introduce a phase shift to at least one of the light pulses.

4. The interrogator of claim 3, wherein the method further comprises phase shifting the at least one of the light pulses by using the phase modulator.

5. The interrogator of claim 1, further comprising an accelerometer for obtaining acceleration data related to vibrations of the interrogator, wherein the controller is communicatively coupled to the accelerometer and further configured to carry out a method comprising:
   receiving the acceleration data;
   determining a correlation between the acceleration data and phase data obtained from interference of reflections of one light pulse of the pair of light pulses off the FBGs with reflections of the other light pulse of the pair of light pulses off the FBGs; and
   adjusting the phase data as a function of the correlation so as to compensate for the vibrations.

6. The interrogator of claim 5, wherein the vibrations of the interrogator comprise vibrations of one or more of: the delay coil; the light source; and a phase modulator comprised in the interrogator.

7. The interrogator of claim 1, further comprising a temperature sensor for obtaining temperature data related to a temperature of the interrogator, wherein the controller is communicatively coupled to the temperature sensor and further configured to carry out a method comprising:
receiving the temperature data;
determining a correlation between the temperature data and phase data obtained from interference of reflections of one light pulse of the pair of light pulses off the FBGs with reflections of the other light pulse of the pair of light pulses off the FBGs; and
adjusting the phase data as a function of the correlation so as to compensate for the temperature.

8. The interrogator of claim 7, wherein the temperature of the interrogator comprises a temperature of one or more of: the delay coil, the light source, and a phase modulator comprised in the interrogator.

9. The interrogator of claim 1, further comprising a GPS receiver, and wherein the controller is further configured to synchronize interrogation of the multiple optical fibers as a function of a signal received from the GPS receiver.

10. The interrogator of claim 1, wherein the controller is further configured to determine Lissajous data from interference of reflections of one light pulse of the pair of light pulses off the FBGs with reflections of the other light pulse of the pair of light pulses off the FBGs.

11. The system of claim 10, wherein the controller is further configured to determine the Lissajous data during interrogation of the multiple optical fibers.

12. The interrogator of claim 1, wherein the controller is further configured to assemble phase data into data packets, wherein the phase data is obtained from interference of reflections of one light pulse of the pair of light pulses off the FBGs with reflections of the other light pulse of the pair of light pulses off the FBGs, and wherein each data packet comprises a key, a frame identifier, and a payload comprising at least a portion of the phase data.

13. The interrogator of claim 12, wherein the controller is further configured to determine whether any of the data packets meet a data error condition and, if so, add an indication to the data packet that the data packet contains erroneous data.

14. The interrogator of claim 13, wherein the data error condition is determined to be met if:
the frame identifiers of consecutively assembled data packets do not meet a first predetermined requirement; or
the keys of consecutively assembled data packets do not meet a second predetermined requirement.

15. The interrogator of claim 14, wherein the first predetermined requirement comprises the frame number of an earlier assembled data packet being one less than the frame number of the next consecutively assembled data packet.

16. The interrogator of claim 14, wherein the second predetermined requirement comprises the key of one of the consecutively assembled data packets being separated from the key of the next consecutively assembled data packets by a preset number of bits.

17. The interrogator of claim 12, wherein the interrogator is further configured to transmit the data packets to a signal processing device communicatively coupled to the interrogator.

18. The interrogator of claim 17, wherein the interrogator and the signal processing device are configured to communicate over a communication line with a throughput of at least 1 Gb/s.

* * * * *